(12) United States Patent
Xie

(10) Patent No.: US 9,119,501 B2
(45) Date of Patent: Sep. 1, 2015

(54) ELECTRIC HEATING COOKER WITH WEIGHING FUNCTION AND WEIGHING CONTROL METHOD THEREOF

(75) Inventor: Guohua Xie, Beijing (CN)

(73) Assignee: Duo Ai Jia (Beijing) Science and Technology Co., Ltd., Beijing (CN)

( * ) Notice: Subject to any disclaimer, the term of this patent is extended or adjusted under 35 U.S.C. 154(b) by 508 days.

(21) Appl. No.: 13/580,374

(22) PCT Filed: Feb. 21, 2011

(86) PCT No.: PCT/CN2011/071132
§ 371 (c)(1),
(2), (4) Date: Aug. 21, 2012

(87) PCT Pub. No.: WO2011/100896
PCT Pub. Date: Aug. 25, 2011

(65) Prior Publication Data
US 2012/0321760 A1    Dec. 20, 2012

(30) Foreign Application Priority Data
Feb. 22, 2010    (CN) .......................... 2010 1 0112847

(51) Int. Cl.
| | |
|---|---|
| H05B 1/00 | (2006.01) |
| A23L 1/01 | (2006.01) |
| A47J 36/32 | (2006.01) |
| G01G 19/52 | (2006.01) |
| G01G 21/22 | (2006.01) |
| A47J 27/00 | (2006.01) |
| A47J 43/07 | (2006.01) |

(52) U.S. Cl.
CPC ................ *A47J 36/32* (2013.01); *A47J 27/004* (2013.01); *G01G 19/52* (2013.01); *G01G 21/22* (2013.01); *A47J 2043/0733* (2013.01)

(58) Field of Classification Search
CPC ...... A01B 12/006; A47J 36/32; A47J 27/004; G01G 19/52; G01G 21/22
USPC .......................................... 426/231
See application file for complete search history.

(56) References Cited

U.S. PATENT DOCUMENTS

| | | | | |
|---|---|---|---|---|
| 4,481,409 | A | * | 11/1984 | Smith ........................... 219/518 |
| 4,625,097 | A | * | 11/1986 | Miwa ............................ 219/441 |
| 4,869,233 | A | * | 9/1989 | Stulen et al. ................ 126/374.1 |
| 5,611,327 | A | * | 3/1997 | Teixeira Filho et al. .... 126/39 R |
| 5,746,114 | A | * | 5/1998 | Harris ............................. 99/331 |
| 6,028,297 | A | * | 2/2000 | Hamada et al. ................ 219/625 |
| 6,075,463 | A | * | 6/2000 | Wauer ....................... 340/870.17 |
| 6,140,617 | A | * | 10/2000 | Berkcan et al. ............ 219/446.1 |
| 6,177,659 | B1 | * | 1/2001 | Yagi et al. ..................... 219/621 |

(Continued)

*Primary Examiner* — Steven Leff
(74) *Attorney, Agent, or Firm* — Lei Yu

(57) ABSTRACT

An electric heating cooker with weighing function and a weighing control method thereof are provided. An electronic scale (5) with weighing function is added under the traditional electric heating cooker and stores cooking experience database and food information database. It solves the problem that users aren't accurate about the amount of water to add for a given weight of ingredient. And experience curve of heating power are designed at different weight points for food such as rice or meat, and also it makes the cooker to intelligently adjust parameters according to the taste feedback of the user so as to be more closer to the user's taste for the cooking next time; additionally it is capable of showing the total and average content of heat quantity, cholesterol, protein, fat, salt and cook oil of various foods in current cooking or if there are unmatched foods.

2 Claims, 15 Drawing Sheets

(56) References Cited

U.S. PATENT DOCUMENTS

| | | | |
|---|---|---|---|
| 6,781,068 B2* | 8/2004 | Zahriya et al. | 177/127 |
| 7,057,144 B2* | 6/2006 | Hirota et al. | 219/624 |
| 7,102,107 B1* | 9/2006 | Chapman | 219/494 |
| 7,598,464 B2* | 10/2009 | Deng | 177/144 |
| 8,816,223 B2* | 8/2014 | Taylor et al. | 177/25.13 |
| 2002/0078942 A1* | 6/2002 | Hershey et al. | 126/1 R |
| 2005/0120887 A1* | 6/2005 | Ejaz et al. | 99/331 |
| 2011/0253693 A1* | 10/2011 | Lyons et al. | 219/209 |

\* cited by examiner

| cooker's type | cooker's weight (g) | cooker lid's weight (g) | cooker's volume | | the slope's critical value of calm stage (g/15seconds) | the slope's critical value of pre-boiling stage (g/15seconds) |
|---|---|---|---|---|---|---|
| | | | inner pot's diameter(cm) | inner pot's height(cm) | | |
| middle-sized automatic rice cooker C20 | 2300 | 720 | 20 | 12.8 | 2 | 4 |
| middle-sized automatic rice cooker C22 | 3300 | 800 | 22 | 13.1 | 2 | 5 |
| large-sized automatic rice cooker C24 | 4800 | 950 | 24 | 11.2 | 3 | 6 |
| small-sized stainless pan C18 | 1100 | 650 | 18 | 10.8 | 2 | 4 |
| middle-sized stainless pan C20 | 1450 | 700 | 20 | 11 | 2 | 5 |
| middle-sized stainless pan C22 | 1600 | 900 | 22 | 12 | 2 | 5 |
| small-sized pressure cooker C18 | 2200 | 800 | 18 | 11.7 | 2 | 5 |
| medium-scale pressure cooker C20 | 3300 | 980 | 20 | 13.5 | 2 | 6 |
| medium-scale pressure cooker C22 | 2800 | 1050 | 22 | 15 | 2 | 6 |
| medium-scale pressure cooker C24 | 3700 | 1200 | 24 | 18.8 | 2 | 6 |
| large-scale pressure cooker C26 | 4200 | 1500 | 26 | 20 | 3 | 7 |

Fig. 21

| ingredient type | content of heat quantity (mg/100g) | content of cholesterol (cal/100g) | content of protein (g/100g) | content of fat (g/100g) | content of carbohydrate (g/100g) | unmatched ingredients | | | matched ingredients | | |
|---|---|---|---|---|---|---|---|---|---|---|---|
| | | | | | | type1 | type2 | type3 | type1 | type2 | type3 |
| egg white | 0 | 53 | 5.3 | 1.3 | --- | | | | | | |
| an egg | 450 | 146 | 16.4 | 3.1 | --- | sweet potato | | | bitter gourd | | |
| beef | 10% | 228 | 25.7 | 14.3 | --- | white spirit | | | potato | | |
| pig's lean meat | 6% | 471 | 62.3 | 23.4 | --- | | | | turnip | | |
| pig's knuckle | 8200 | 114 | 12.9 | 7.2 | --- | | | | | | |
| pork ribs | 105 | 209 | 22.8 | 12.5 | --- | | | | | | |
| egg yolk | 3000 | 333 | 37.5 | 23.9 | --- | | | | | | |
| eel | 186 | 83 | 16.7 | 2.2 | --- | | | | | | |
| grass carp | 85 | 131 | 24.6 | 1.3 | --- | | | | | | |
| squid | 1170 | 101 | 19.1 | 2.6 | --- | | | | | | |
| crab | 164 | 37 | 6.9 | 2.9 | --- | | | | | | |
| lard | 110 | 727 | --- | 81.8 | --- | | | | | | |
| beef tallow | 110 | 727 | --- | 81.8 | --- | | | | | | |
| peanut oil | | 889 | --- | 100 | --- | | | | | | |
| salad oil | | 889 | --- | 100 | --- | | | | | | |
| bitter gourd | 0 | 2.9 | 1.4 | 0.3 | 19 | | | | | | |
| spinach | 0 | 4.3 | 2.2 | 0.4 | 29 | Tofu | | | | | |
| sponge cucumber | 0 | 5.64 | 2.9 | 0.5 | 37 | | | | | | |
| turnip | 0 | 4.8 | 2.3 | 0.4 | 3 | carrot | | | sponge cucumber | | |
| Chinese cabbage | 0 | 2.3 | 1.4 | 0.3 | 13 | | | | | | |
| cucumber | 0 | 2.5 | 1.3 | 0.2 | 17 | | | | | | |
| Tofu | 0 | 63 | 5.5 | 4 | 1.6 | spinach | | | shallot | | |

Fig. 22

ELECTRIC HEATING COOKER WITH WEIGHING FUNCTION AND WEIGHING CONTROL METHOD THEREOF

CROSS REFERENCE OF RELATED APPLICATION

This is a U.S. National Stage under 35 USC 371 of the International Application PCT/CN2011/071132, filed on Feb. 21, 2011.

BACKGROUND OF THE PRESENT INVENTION

1. Field of Invention

The present invention refers to an electric heating cooker and its control method, especially a kind of electrical heating cooker with weighing function and weighing control method thereof. It belongs to the field of electric heating appliance used in kitchen.

2. Description of Related Arts

Traditionally the electric heating cooker has the function of boiling and steaming, such as automatic rice cooker, electric pressure cooker, electric ceramic cooker or electromagnetic furnace. When cooking, they measure the change of temperature or the pressure in the cooker, or they set the length of cooking time to control the whole process of cooking. But in fact during the cooking with the change of temperature in the cooker, the water vapor will go out which results in the change of the weight of the whole cooker. And the speed of evaporating vapor reflects the boiling status of the water in the cooker and the amount of the remaining water therein.

Additionally when cooking the user don't have an exact idea of how much water to be put into the cooker according to the amount of food. If more water is added the rice will be softer and it takes more time to cook, which is a waste of electric energy. If less water is added the rice will be harder and it will easily stick to the cooker, which is a waste food. Sometimes according to cook recipe users are required to add several grams of cooking oil, several grams of salts or tens of grams of auxiliary ingredient. But it's hard for users to add the weight to the precision of several grams.

FIG. 1 is a weight change curve S1 of the whole automatic rice cooker during cooking rice which is a typical representative of the traditional electrical heating cooker.

The X-axis is the time axis. The Y-axis is the weight axis of the whole cooker. At $t_{00}$ there is nothing added in the cooker. The weight of the whole cooker is $(m_c)$.

(A) is called as add-main-ingredient stage. From $t_{00}$ uncooked dry rice having a weight of $(m_p)$ is added into the cooker. Then the weight of the whole cooker is $(m_c+m_p)$.

(B) is called as add-water stage. From $t_{10}$ water having a weight of $(m_w)$ is added into the cooker. Then the weight of the whole cooker is $(m_c+m_p+m_w)$.

(C) is called as calm stage. From $t_{20}$, the cooker is heated with an initial electrical power $U_0$. At this stage because almost no vapor goes out from the cooker, the weight change is so tiny as to ignore. The absolute value of the slope $K_c$, which shows the speed of weight change of the whole cooker, approaches 0.

(D) is called as pre-boiling stage. At this stage heating power is still $U_0$. The temperature of the lower part of the water becomes higher and higher. It begins to boil partially. Vapor begins to go out from the cooker. But the upper part of the water doesn't boil yet. So at this stage although $K_c$ is increasing, it doesn't reach to the maximum value $K_{max}$.

(E) is called as boiling stage. At this stage the heating power is still $U_0$. All of the water in the cooker is boiling. Vapor tries to go out as fast as possible. But because of the constraint of the vapor outlet of cooker vapor goes out at a relatively constant speed. So at this stage $K_c$ reaches to the maximum value $K_{max}$ and keeps near this constant value $K_{max}$.

(F) is called as boiling-ending stage. At this stage the heating power is still $U_0$. All of the water in the cooker is boiling. But because most of the water in the cooker has evaporated from the cooker, the remaining water becomes less and less, and the vapor which goes out becomes less and less. So at this stage $K_c$ decreases slowly from $K_{max}$.

(G) is called as heat preservation stage. At $t_{60}$ because of the lack of water in the cooker the temperature of the bottom of the cooker increases sharply, which causes the electric heating cooker to trip out, thus enters the heat preservation stage. Then the electric heating cooker starts to preserve heat with another heating power $U_k$. The whole process of cooking rice is completed. At this point the weight of rice cooked is $m_f$ and the weight of the whole cooker is $(m_c+m_f)$. It can be seen that $m_f > m_p$ because the uncooked rice absorbs water and gets heavier. The weight of the evaporated water is $(m_p+m_w-m_f)$.

Research indicates that using the same cooker, adding the same weight of mp of dry rice, adding the same weight of $(m_w)$ of water and heating with the same heat power $U_0$, the whole process complies with the weight change curve S1. At the end the same weight of $(m_f)$ is got. The error is several grams.

FIG. 2 is a weight change curve S2 of the whole automatic rice cooker which is a typical representative of the traditional electrical heating cooker during cooking porridge or stewing meat or cooking soup.

Compared with S1, S2 is some similar. The difference is that during S2 in addition to adding main ingredient such as rice, pork, chicken, etc, other auxiliary ingredients are required to be added in as well. For example a small amount of mung beans maybe required to be added in for cooking porridge. Red date, Semen Nelumbinis and star anise maybe required to be added in for stewing chicken. So after (A) add-main-ingredient stage, another staged is added, named (A1) add-auxiliary-ingredient stage. Assume the number of the kinds of auxiliary ingredients is N, the weight of each auxiliary ingredient required is $(m_{ai})$, total weight of auxiliary ingredients is $(m_a=m_{a1}+m_{a2}+ \ldots +m_{ai}+m_{aN})$. After that is the (B) add-water stage as well. At this time the total weight of the cooker is $(m_c+m_p+m_a+m_w)$. The next are (C) calm stage, (D) pre-boiling stage and (E) boiling stage. But during stewing or cooking porridge or cooking soup users normally will not evaporate all the water in the cooker and will leave much water in cooker to form soup juice. So after the (E) boiling stage, $K_c$ will always keep near the constant value $K_{max}$. It depends on the user's experience to decide when to end this cooking. Because there is no lack of water in at the bottom of the cooker, no tripping out due to sharply increased temperature is exsisted. Therefore, there is no (F) boiling-ending stage. The last to enter is (G) heat preservation stage. The electric heating cooker starts heat preservation with another heating power $U_K$. This completes the process of cooking porridge or stewing meat or cooking soup. At this point the weight of the whole cooker is $(m_c+m_f)$.

Research indicates that using the same cooker, adding the same weight of $m_p$ of main ingredient, adding the same weight of $(m_a)$ of auxiliary ingredients, adding the same weight of $(m_w)$ of water and heating with the same heat power $U_0$, the whole process complies with the weight change curve S2. At the end the same weight of $(m_f)$ is got. The error is several grams.

When using other electric heating cookers such as electric ceramic cooker or electromagnetic furnace to cook food, the similar weight change curve S1 or S2 is got.

According to Chinese cooking custom called 'Big fire to boil food and then small fire to stew food', it requires to adequately extend the time length of (E) boiling stage of S1 curve or S2. If (F) boiling-ending stage exists, extend the time length of (F) boiling-ending stage too. In order to extend the time length of (E) or (F), different heating power at different time points is required to be used, in such a manner that water evaporates more slowly and food exists in the boiling water longer. But traditional electric heating cookers use one heating power $U_0$ to cook until the heat preservation stage. They have no good way to use different power at different points. They either measure the temperature of the water in the cooker or set the heating time to control the process. Without an exact idea, users depend on their experience to decide how much water to be added for the given amount of food ingredient. A conventional way to control electric heating cooker is often a fuzzy control method. Even for the same weight of food, due to the weight of water added by users is different in each time, the flavor, e.g., the rice cooked is some soft or some hard or that the soup cooked is some light or some strong, is different each time.

In addition, traditional electric heating cookers can't make user to choose the flavor each time according to the user's different favorite. For example this user wants the rice cooked to be softer, medium or harder. Or this user wants the flavor of the soup cooked to be lighter, medium or stronger. Traditional electric heating cookers can't let users to do such choice. And Traditional electric heating cookers lack intelligence. They can't adjust themselves according to the user's feedback after eating the food cooked thereby. For example, if this time the user expects the hardness of the rice cooked to be medium, but actually the rice cooked is some what harder than the user's expectancy. Traditional electric heating cookers have no way to adjust themselves according to the user's feedback so as to be closer to the user's taste for the cooking next time.

Additionally, now people pay more attention to the healthy of diet. Factors that affect the health of people include that everyday people eat too much salt or cook oil, or eat the food that has too much heat quantity, cholesterol, protein or fat, or eat two kinds of food together which will be bad to health if mixed. A research from China indicates that in China averagely a man eats 12 g of salt everyday, and averagely 15~18 g of salt in the North of China and 10 g of salt in the South. Eating too much salt causes the disease of hypertension, which has been a 'silent killer' of the Chinese heath. Thus, people should eat less salt to prevent and control hypertension. Eating too much cholesterol each day is bad for blood vessel of brain; too much heat quantity, protein or fat will causes the diseases of fat, hyperlipaemia, cardiovascular and cerebrovascular; Sometimes if two kinds of food cooked together will affect the heath, which are called unmatched foods. For example, people will get calculus disease easily if they eat spinach and Tofu cooked together. World Health Organization advocates that everyday each man eats 5~6 g of salt and has a healthy and bland diet. The cook oil which has more unsaturated fatty acid and less saturated fatty acid is advised. Usually 25 g of oil is enough for the daily diet of a man. Thus, it is necessary for people to know clearly how much salt, cook oil, heat quantity, cholesterol, protein and fat they have taken for the daily diet. There are paper tables which list cholesterol content, heat quantity content, etc for 100 g of various foods or list unmatched food to cook together. But it's hard for people to look up and calculate. It requires people themselves to calculate according to the actual weight of food. And people often have not weighed the accurate weight of food. For example people will often add salt or oil according to their experience which is not accurate. It's difficult for users to control the precision of several grams.

In view of the above defects of traditional electric heating cookers, the researcher of this invention has introduced an electric heating cooker with weighting function and a weighing control method thereof, and it can display the content of heat quantity, cholesterol, protein, fat, salt and cook oil for the food cooked thereby

SUMMARY OF THE PRESENT INVENTION

The first object of the invention is to solve the problem that users aren't clear and accurate about adding how much water for the given weight of ingredients when using electric heating cooker to cook rice or steam or stew food; Secondly, the object of the invention is to decide the inner status of electric heating cooker by measuring the weight change and the weight change speed because of evaporating of vapor. And experience curves of heating power are designed at different weight points of foods cooked by electric heating cooker, such as rice or meat. Accordingly different heating power is switched at different weight points of the whole electric heating cooker so as to meat the Chinese cooking custom called 'Big fire to boil food and then small fire to stew food'. And temperature control and time control are used to assist completing the whole cooking process; Thirdly, the object of the invention is to make the cooker to intelligently adjust parameters according to the taste feedback of the user so as to be more closer to the user's taste for the cooking next time; Another object of the invention is to make the user have a clear and exact knowledge of the total and average content of heat quantity, cholesterol, protein, fat, salt and cook oil or if there are unmatched foods.

Hence the technology used in the invention is as the following.

A weighing control method of an electric heating cooker comprises the following steps of:

firstly, assembling a electronic scale with high-precision under the electric heating cooker, wherein precision of the electronic scale is 5 g, 2 g or 1 g, and a weight of the whole cooker is calculated by a main control unit of the electronic scale using a real-time pressure signal sent by a weight sensor of the electronic scale;

secondly, storing the following information in a memory of the main control unit as a cooking experience database and a cooker information database, comprising:

different cooking modes wherein available modes comprises cooking rice, cooking porridge, cooking soup and stewing meat, cooker information, comprising cooker's type, cooker's weight, cooker lid's weight, cooker's volume, the slope's critical value of calm stage and the slope's critical value of pre-boiling stage, information of a main ingredient needed for a specific cooking mode, which includes the main ingredient's type and weight, information of auxiliary ingredients needed, which includes each kind of auxiliary ingredient's type and weight, standard weight of water needed, adjustment values for flavors, which comprises a water fine-tuning weight value for a medium flavor, a fine-tuning weight value for a flavor of hard rice or strong soup, a fine-tuning weight value for flavor of soft rice or light soup, an initial heating power, an expected time taken to achieve boiling totally, after boiling to a specific weight point, another heating power is used until another specific weight point or until a specific timeout happens, and other auxiliary ingredients' type and weight needed to be added during boiling;

thirdly, before the beginning of electrical heating, searching from the cooking experience database and the cooker information database stored in the memory of the main control unit according to factors chosen by the user, which comprise a cooking mode, cooker information, main ingredient's type, and main ingredient's weight added in, and flavor expected wherein available flavor options include medium, rice hard, rice soft, soup strong, soup light, so as to inform users types and weight of auxiliary ingredients to be added fourthly, after the beginning of electrical heating, measuring the weight change of the whole electric heating, cooker so as to obtain a slope which reflects the evaporating speed of the vapor, wherein this slope is compared with a slope's critical value of calm stage and a slope's critical value of pre-boiling stage to get the inner status of cooking of the cooker, the whole cooking heating process is divided into a calm stage, a pre-boiling stage, a boiling-front stage, a boiling-later stage and a heat preservation stage, and the initial heating power is used before the boiling-later stage begins, further during the boiling-later stage according to the cooking experience database at a specific weight point another heating power is used until another specific weight point or until a specific timeout happens, or ask the user to add another kind of auxiliary ingredients with a certain weight into the cooker, in the end heat preservation heating is used in the power heat preservation stage;

fifthly, after achieving the cooking process, requiring the user to give flavor feedback for this cooking, accordingly the cooker will adjust the adjustment value for flavors of the cooking experience database stored in the memory of the main control unit to increase or decrease the water fine-tuning weight value.

An electrical heating cooker with weighing function to realize the weighing control method mentioned above, comprises a body (1), a pot (2), an electric heater (3) for heating the pot (2), a temperature sensor (4) for measuring temperature of the bottom of the pot, a lid (6) fitting with the pot (2), wherein an electronic scale (5) is assembled under the pot (2);

a tray (51) of the electronic scale (5) is fixed at the bottom of the body (1), and the total weight of the electrical heating cooker and the tray (51) is sensed by a weight sensor (52) of the electronic scale (5) and then is sent to a main board (53) of the electronic scale (5) for processing in a manner of a pressure signal, and the weight sensor (52) is fixed at a bottom of a shell (54) of the electronic scale (5);

electric supply goes through a jack (55) of the shell (54) and is sent to the main board (53) to provide electricity for entire circuit, and the main board (53)'s power cable (56) is connected to the electric heater (3) through the hole (57) in the center of the tray (51) to transmit heating power signal or power control signal to the electric heater (3), and a signal cable (58) of the temperature sensor (4) is also connected to the main board (53) through the hole (57);

the main board (53) consists of a central processing unit (531), a heating power control unit (532), a weight signal processing unit (533), a temperature signal processing unit (534), a voice unit (535), a keyboard processing unit (536), an LCD displaying control unit (537), a mobile wireless modem unit (538), a memory unit (539), a console processing unit (5310), a clock unit (5311), and a power unit (5312);

an LCD (59), a keyboard (60), a console (61) and a loudspeaker (62) located at the shell (54) are all connected to the main board (53); and the memory unit (539) stores cooking experience database, cooker information database and food information database.

Thepot (2), the body (1), and the electric heater (3) use the mode of unification or the mode of separation.

The electric heater (3) uses a voltage heating mode, then the heating power control unit (532) outputs different voltage to the electric heater (3) through the power cable (56).

The electric heater (3) uses an electromagnetic heating mode, then the heating power control unit (532) outputs different electromagnetic power control signal to the electric heater (3) through the power cable (56).

A record of the cooking experience database comprises cooker's type, cooking mode, information of main ingredient needed, information of auxiliary ingredients needed, standard weight of water needed, adjustment values for flavors and a serial of action instructions.

A record of the cooker information database comprises cooker's type, cooker's weight, cooker lid's weight, cooker's volume, slope's critical value of a calm stage and slope's critical value of a pre-boiling stage.

A record of the food information database comprises ingredient type, content of heat quantity per 100 g of the ingredient, content of cholesterol per 100 g of the ingredient, content of protein per 100 g of the ingredient, content of fat per 100 g of the ingredient, unmatched ingredients for the ingredient, and matched ingredients for the ingredient.

The action instruction is a heating action instruction or an adding-auxiliary-ingredient action instruction, and the heating action instruction comprises a parameter of heating power, a parameter of weight decreased and a parameter of time length, and the adding-auxiliary-ingredient action instruction comprises a parameter of adding auxiliary ingredient, a parameter of auxiliary ingredient's type and a parameter of auxiliary ingredient's weight.

The electronic scale (5)'s precision reaches 5 g, 2 g or 1 g.

The weighing control method applies to electric heating cookers of voltage heating or electromagnetic heating, and doesn't involve the field of gas cooker.

The advantage of this invention is as the following.

This invention can not only make the user to have an accurate control of the weight of food and water to be added when using electrical heating cooker to cook rice or cook porridge or cook soup or stew meat, but also can apply the weighing control method assisted by temperature control and time control to achieve the standardization, automation, accuracy and intelligentization of the whole cooking process of the electrical heating cooker. In addition, this invention can display accurately the content of heat quantity, cholesterol, protein, fat of the food cooked thereby, and also this invention can warn the user if unmatched ingredients are used, so as to achieve the health of cooking.

The invention not only applies to electrical heating cookers using the voltage heating mode such as automatic rice cooker, electric ceramic cooker and electric pressure cooker, but also applies to electrical heating cookers using the electromagnetic heating mode such as electromagnetic furnace whose electric heater is apart from the pot above it. But the invention doesn't refer to the field of gas cooker.

BRIEF DESCRIPTION OF THE DRAWINGS

FIG. 19 is a schematic view of a cooking experience database which takes a middle-sized automatic rice cooker C20 having a diameter of an inner pot of 20 cm as an example, illustrating different cooking processes designed for different types of main ingredients having different weight under different cooking modes, or for the same type of main ingredients having different weight under different cooking mode.

FIG. 20 is a schematic view of the cooking experience database which is the continuation of FIG. 19 and adds the data items of cooking experience for a different type of a middle-sized stainless pan C22 with a diameter of an inner pot of 22 cm.

FIG. 21 is a schematic view of a cooker information database, which is one part of the cooking experience database and is closely related with the cooker's types shown by the FIG. 19 and the FIG. 20

FIG. 22 is a schematic view of a food information database, illustrating the information of some kinds of food, including their unmatched foods and matched foods.

Wherein 1. body, 2. pot, 3. electric heater, 4. temperature sensor, 5. electronic scale, 6. lid, 51. tray, 52. weight sensor, 53. main board, 54. shell, 55. jack, 56. power cable, 57. hole, 58. signal cable, 59. LCD, 60. keyboard, 61. console, 62. loudspeaker, 531. central processing unit, 532. heating power control unit, 533. weight signal processing unit, 534. temperature signal processing unit, 535. voice unit, 536. keyboard processing unit, 537. LCD control unit, 538. mobile wireless modem unit, 539. memory unit, 5310. console processing unit, 5311. clock unit, 5312. power unit.

DETAILED DESCRIPTION OF THE PREFERRED EMBODIMENT

The present inventions now will be described more fully hereinafter with reference to the accompanying drawings, in which principle and some examples of the embodiments of the invention are shown.

Figure 1:
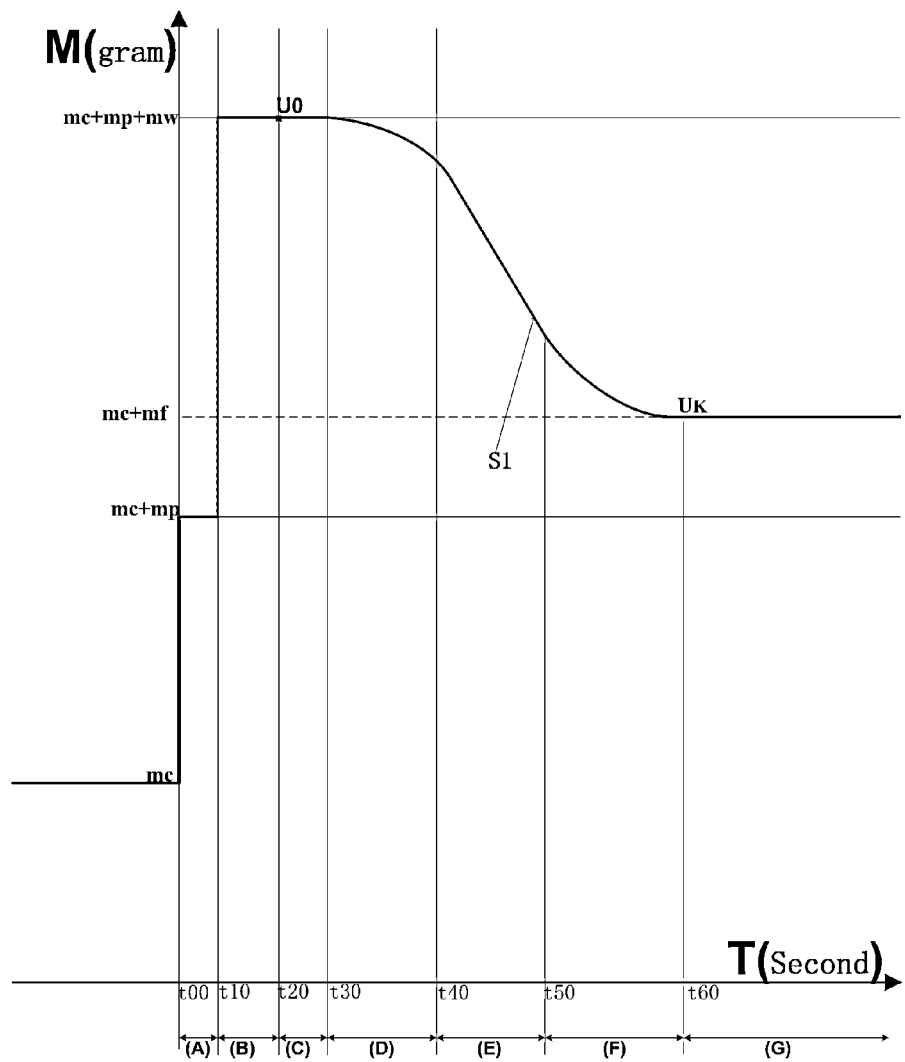
FIG. 1 is the weight change curve S1 of the traditional electrical heating cooker during cooking rice.
Figure 2:
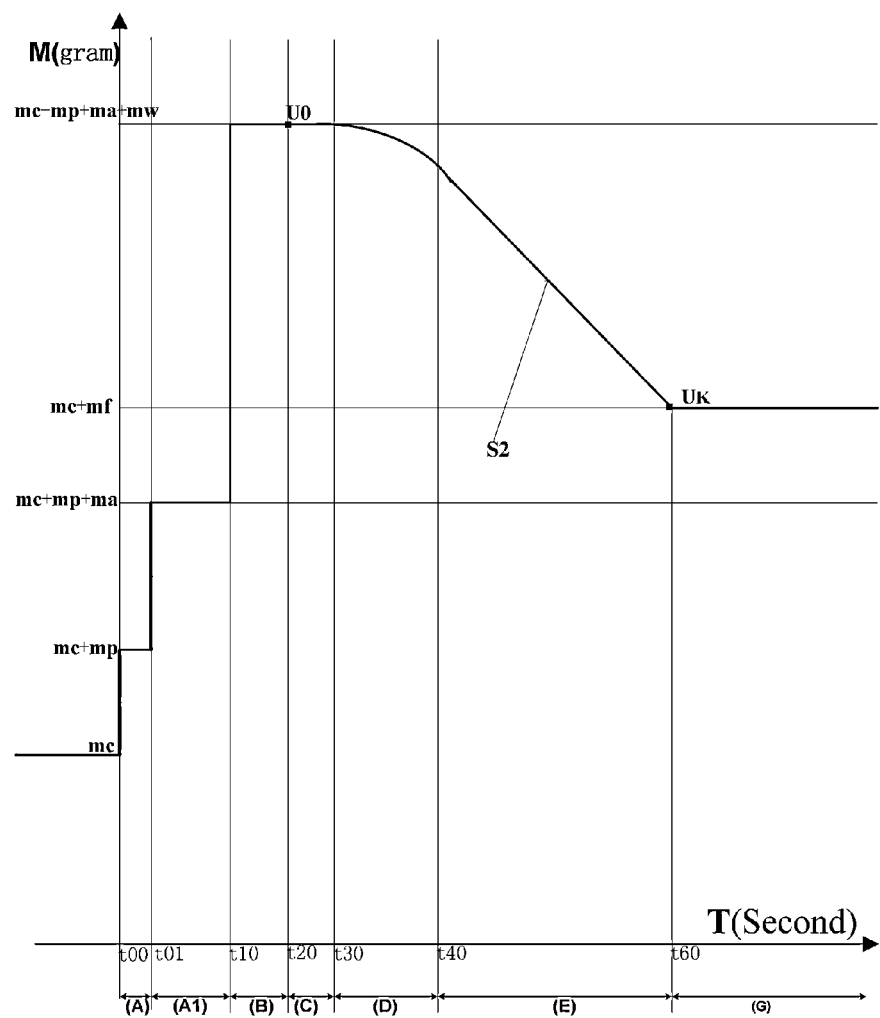
FIG. 2 is the weight change curve S2 of the traditional electrical heating cooker during cooking porridge or stewing meat or cooking soup.
Figure 3:
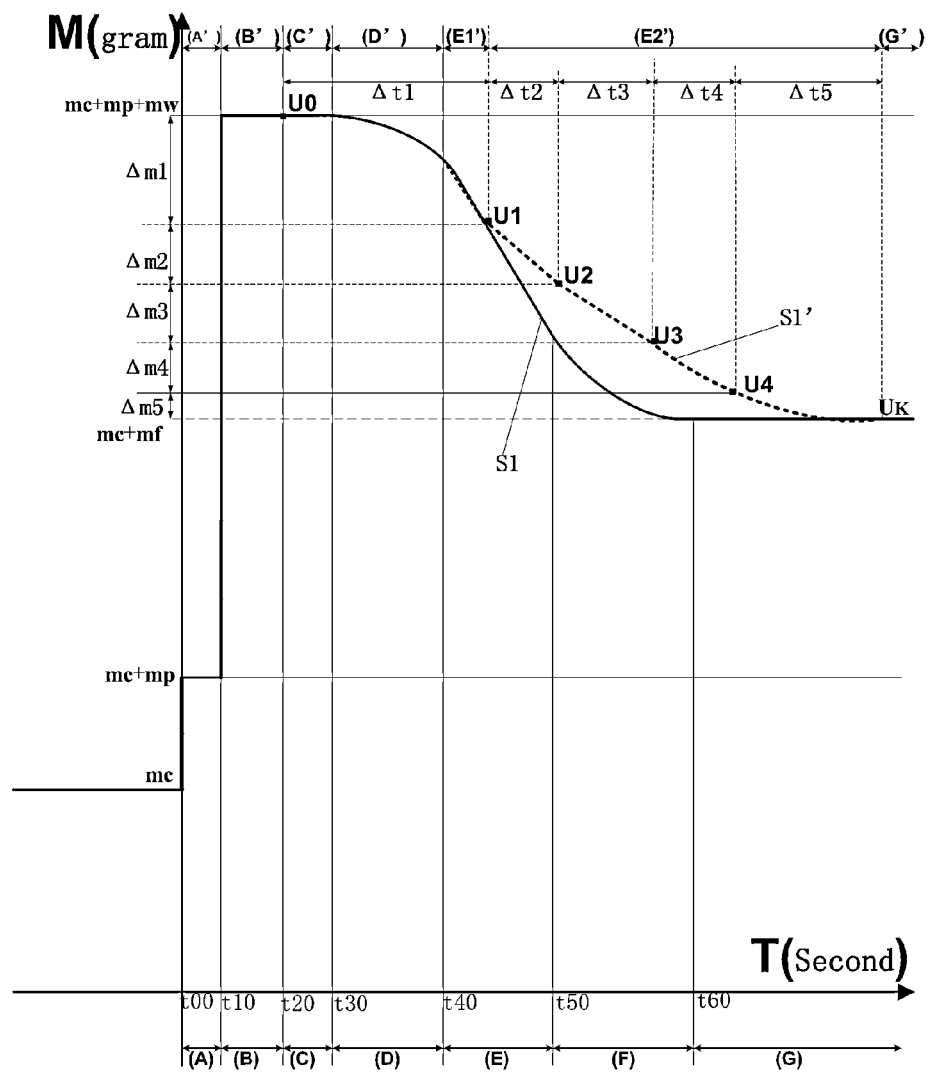
FIG. 3 is a comparison diagram for showing the difference between the weight change curve S1' of the electrical heating cooker of this invention and the weight change curve S1 of the traditional electrical heating cooker during cooking rice.

As shown by FIG. 3, curve S1' is the weight change curve of the electrical heating cooker of this invention, which demonstrates the same points and the different points compared with the weight change curve S1 of the traditional electrical heating cooker during cooking rice.

The curve S1' goes through the stages as following: add-main-ingredient stage (A'), add-water stage (B'), calm stage (C'), pre-boiling stage (D'), boiling-front stage (E1'), boiling-later stage (E2') and heat preservation stage (G'). The curve S1' combines the curve S1's boiling stage (E) with boiling-ending stage (F) and then divides it into boiling-front stage (E1') and boiling-later stage (E2'). Different from the traditional weight change curve S1, the weight of water to be added by the user at add-water stage (B') is an accurate value, and this value comes from summarized information provided by users, which includes the cooking mode chosen, cooker information chosen, the main ingredient's type chosen, the main ingredient's weight added in, the flavor expected. What is the same as S1 is that the initial heating power $U_0$ is used at the calm stage (C'), pre-boiling stage (D'), and boiling-front stage (E1') of the curve S1'. But at boiling-later stage (E2') of the curve S1' several kinds of heating power are used at different weight points, which adequately extend the time length of boiling food. At last, heat preservation stage (G') is entered after the food is cooked. The process of the curve S1' is described thoroughly as the following.

The first is add-main-ingredient stage (A'). At $t_{00}$ the user starts a cooking process and needs to choose and confirm the cooker information including cooker's type, cooker's weight, cooker lid's weight, and cooker's volume. As for the electrical heating cooker using the mode of unification of the pot and the electric heater, such as automatic rice cooker and electric pressure cooker, the pot is fixed above the pot, so the cooker information is not changeable, hence the user can confirm directly and doesn't need to choose. But as for the electrical heating cooker using the mode of separation of the pot and the electric heater, such as electromagnetic furnace, different kinds of pots can be placed on the electromagnetic furnace to cook food such as ordinary pot and pressure pot, wherein pressure pot can have the volume styles of big style, middle style and small style, as a result different style of pot will require different weight of water to be put into, and thereafter the weighing control process will also be different. Secondly, the user needs to select one of the cooking modes (available modes include cooking rice, cooking porridge, cooking soup and stewing meat) as a cooking rice mode and the user needs to select the main ingredient's type because different main ingredient's type will also affect the weight of water to be added later. For example there are the types of the rice of the northeast region and the rice of the south region of China, and the rice of the south region of China is classified as the spring rice and the autumn rice, and the rice is also classified as the old rice and the new rice. Different kind of rice has different content of starch and water, which will affect different weight of water to be put into. Thirdly, the user needs to select the flavor expected (available flavor options include medium, rice hard, rice soft, soup strong, soup light). As for cooking rice someone wants the rice cooked to be hard, someone wants it to be medium, but someone, like the older, wants it to be softer to help to digest easily. So different flavor expected affects different weight of water to be put into. Next the electronic scale of this invention will inform the user to add rice and the LCD of the electronic scale will continuously display the weight of the rice the user has added, which will make user have an accurate knowledge of the weight of rice that has been added into the cooker. After the user confirms the finish of adding rice, the electronic scale finally gets the weight ($m_p$) of the rice uncooked added. In order to be understood and observed easily, the curve S1' is in such a shape, in which the line segment from $t_{00}$ to $t_{10}$ is drawn to be parallel to the time axis and this line segment stands for the process of selecting the cooker information, the cooking mode, the main ingredient's type and rice adding.

The second is add-water stage (B'). From $t_{10}$ the user is required to add the accurate weight of water into the pot according to the hint of the electronic scale. The weight of ($m_w$) is acquired by searching from the cooking experience database stored in the memory of the main control unit according to the several factors {cooker's type, cooking mode, the main ingredient's type, the main ingredient's weight, the flavor expected} input at the previous add-main-ingredient stage (A'). $m_w$ is equal to the sum of the standard weight of water needed and the adjustment value for the flavor chosen by the user. In order to be understood and observed easily, the curve S1' is in such a shape, in which the line segment from $t_{10}$ to $t_{20}$ is drawn to be parallel to the time axis T. But actually it's a slow process when the user adds water into the pot and the total weight of the electrical heating cooker increases like a diagonal line. During adding water the electronic scale's LCD continuously displays the weight of the water the user has added and the weight of the remaining water that the user should add next, which will make user have an accurate knowledge of the weight of water added into the cooker.

The third is the calm stage (C'). At $t_{20}$ the electronic scale informs the user to put the lid on and confirm starting heating by the hint of LCD and voice. After the user confirms starting heating, the calm stage (C') is entered. Thereafter the electronic scale will apply the weighing control method to the completeness of the whole process of rice cooking. At first the electronic scale reads the first action instruction $\{U_0, \Delta m_1, \Delta t_1\}$ from the cooking experience database stored in the memory. The electronic scale starts to heat using the initial heating power $U_0$. At this time the weight of the whole cooker is ($m_c+m_p+m_w$). From $t_{20}$ the electronic scale will measure the weight of the whole cooker in real time and calculate the absolute value of the slope $K_c$ which reflects the speed of the weight change of the whole cooker.

The meaning of the action instruction mentioned above is explained here. Every action instruction is a set of parameters of $\{U_{i-1}, \Delta m_i, \Delta t_i\}$. According to the value of $U_{i-1}$ it can be differentiated that whether this instruction is a heating action instruction or an adding-auxiliary-ingredient action instruction. As an example of the embodiments of the invention, whether $U_{i-1}$ is equal to 9 is used to differentiate the type of an action instruction. If $U_{i-1}$ is greater than 9 and $U_{i-1}$ belongs to the set of the heating power values which can be output by electric heater, then this action instruction is a heating action instruction. If $U_{i-1}$ is equal to 9, then this action instruction is an adding-auxiliary-ingredient action instruction. If this action instruction is confirmed to be a heating action instruction, then the meaning of $\{U_{i-1}, \Delta m_i, \Delta t_i\}$ is that: $U_{i-1}$ is the heating power value and starting from this point the power $U_{i-1}$ is used to heat until another point that the weight of the electrical heating cooker decreases $\Delta m_i$. The expected time length is $\Delta t_i$. If $\Delta m_i$ is not equal to 0, $\Delta m_i$ is a determining factor of controlling and $\Delta t_i$ is only an auxiliary factor of monitoring. If after a time length of $\Delta t$ has elapsed, the weight of the electrical heating cooker hasn't decreased $\Delta m_i$, and $\Delta t - \Delta t_i > \epsilon_1$ ($\epsilon_1$ is a time threshold), then it indicates that the time length $\Delta t$ for the weight to decrease $\Delta m_i$ has greatly exceeded the normal $\Delta t_i$ expected, hence it's assumed that abnormal situation has occurred, for example the city electricity power is switched off or the voltage of the city electricity power is so low that the electric heater can't work normally, if that happens the warning message should be notified to the user. If $\Delta m_i$ is equal to 0 and $\Delta t_i$ is not equal to 0, then $\Delta t_i$ is a determining factor of controlling, and the meaning of $\{U_{i-1}, \Delta m_i, \Delta t_i\}$ is that $U_{i-1}$ is the heating power value and starting from this point the power $U_{i-1}$ is used to heat until the timeout of $\Delta t_i$ happens. This can apply to the situation that the combination use of weighing control and time control to heat. For example, the user wants to use weighing control to heat from this weight point to that weight point, or use time control to heat from this weight point to the next point. If $U_{i-1}$ is equal to 9, then this action instruction is an adding-auxiliary-ingredient action instruction, then the meaning of $\{U_{i-1}, \Delta m_i, \Delta t_i\}$ is that: $U_{i-1}$ is the indication of an adding-auxiliary-ingredient action instruction, $\Delta t_i$ is the auxiliary ingredient's type to be added, $\Delta m_i$ is the auxiliary ingredient's weight to be added. This kind of adding-auxiliary-ingredient action instruction applies to the situation that a specific auxiliary ingredient is required to be added by the user during the process of boiling.

At calm stage (C') it's in stage of beginning to heat. Because the temperature of the water is very low, there is almost no vapor to go out from the cooker. The weight change is so tiny as to ignore. $K_c$ is the absolute value of the slope, which shows the speed of weight change of the whole cooker. $K_c$ is less than the slope's critical value of calm stage.

The fourth is pre-boiling stage (D'). At this stage the initial heating power of $U_0$ is still used. Different from calm stage (C'), the temperature of the bottom part of the water in the cooker becomes higher and higher. It begins to boil partially. Vapor begins to go out from the cooker. The weight of the cooker begins to decrease. But the upper part of the water doesn't boil. Although $K_c$ is increasing, it doesn't reach to the maximum value. $K_c$ is greater than the slope's critical value of calm stage but less than the slope's critical value of pre-boiling stage.

The fifth is boiling-front stage (E1'). At this stage the heating power of $U_0$ is still used. All of the water including the lower part and the upper part is totally boiling. Vapor tries to go out as fast as possible. But because of the constraint of the vapor outlet of cooker vapor goes out at a relatively constant speed. So at this stage $K_c$ is greater than the slope's critical value of pre-boiling stage and reaches to the maximum value. And it almost keeps this maximum value. The electronic scale continuously measures the weight of the whole electrical heating cooker and compares it with the initial weight of ($m_c+m_p+m_w$). Once the weight of the whole electrical heating cooker decreases $\Delta m_1$, boiling-front stage (E1') is ended, then the electronic scale reads the next action instruction $\{U_1, \Delta m_2, \Delta t_2\}$ from the cooking experience database stored in the memory and then the boiling-later stage (E2') is entered.

The sixth is boiling-later stage (E2'). This stage is adjoining to boiling-front stage (E1'). In order to apply the Chinese cooking custom called 'Big fire to boil food and then small fire to stew food', it requires to adequately extend the time length of boiling. The heating power of $U_1$ is less than the initial heating power of $U_0$. Because of the decreasing of the heating power, vapor goes out from the cooker at a lower speed. $K_c$ of this stage is less than the maximum of the $K_c$ of the boiling-front stage (E1'). The electronic scale continuously measures the weight of the whole electrical heating cooker and compare it with the weight at the point when the cooker begins to heat with the power $U_1$. If the weight of the whole electrical heating cooker decreases $\Delta m_2$, boiling-front stage (E1') is ended, then the electronic scale reads the next action instruction $\{U_2, \Delta m_3, \Delta t_3\}$ from the cooking experience database stored in the memory. At this point the weight of the whole electrical heating cooker is $(m_c+m_p+m_w-\Delta m_1-\Delta m_2)$.

At boiling-later stage the time control method can also be combined to use. From the meaning of $\{U_{i-1}, \Delta m_i, \Delta t_i\}$, if $\Delta m_i$ is equal to 0, then $\Delta t_i$ is as an exact time length of heating. The heating power $U_{i-1}$ is used to heat for a time length of $\Delta t_i$.

At boiling-later stage another kind of auxiliary ingredient maybe required to be added. Such situation can also occur often during the cooking. Then the action instruction $\{U_{i-1}, \Delta m_i, \Delta t_i\}$ requires the user to add the type of $\Delta t_i$ of auxiliary ingredient, whose weight is $\Delta$mi.

So that during boiling-later stage (E2') the next action instruction of $\{U_{i-1}, \Delta m_i, \Delta t_i\}$ is repeatedly read until the heat preservation stage (G') is entered. After that the heating power of $U_k$ is used to keep the food warm.

Figure 4:
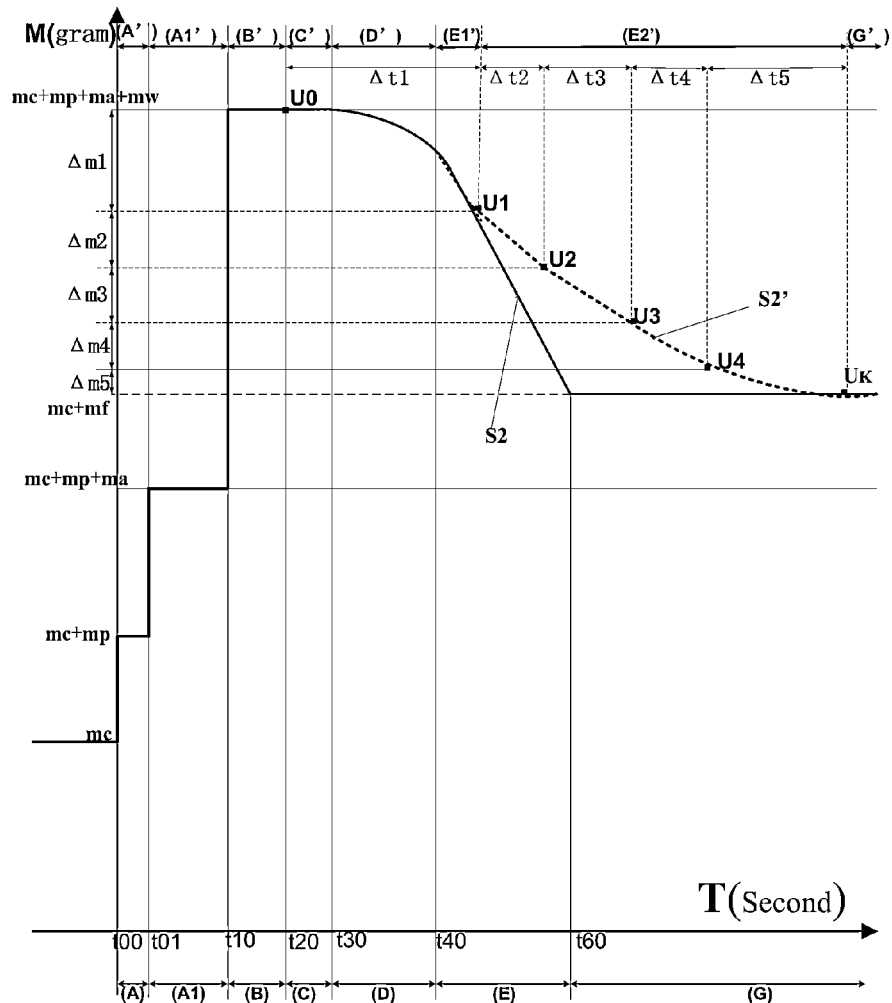
FIG. 4 is a comparison diagram for showing the difference between the weight change curve S2' of the electrical heating cooker of this invention and the weight change curve S2 of the traditional electrical heating cooker during cooking porridge or stewing meat or cooking soup.
Figure 5:
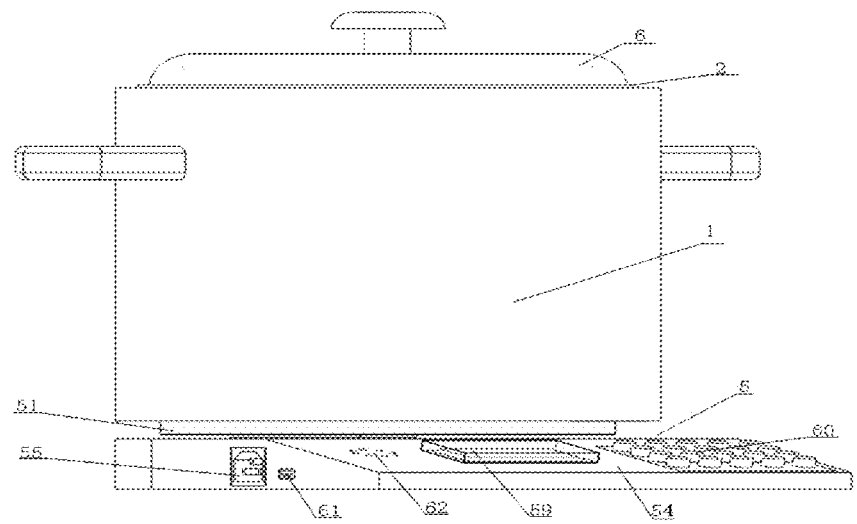
FIG. 5 is a front view of an example 1 of the embodiments of this invention.
Figure 6:
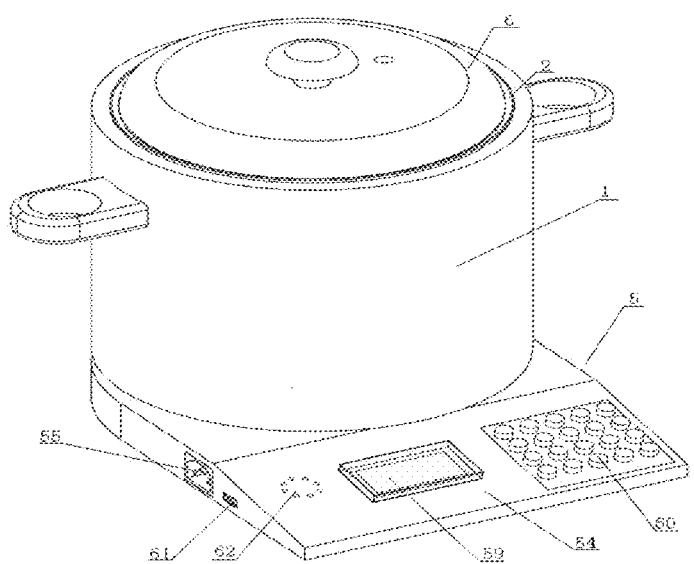
FIG. 6 is a vertical view of the example 1 of the embodiments of this invention.
Figure 7:
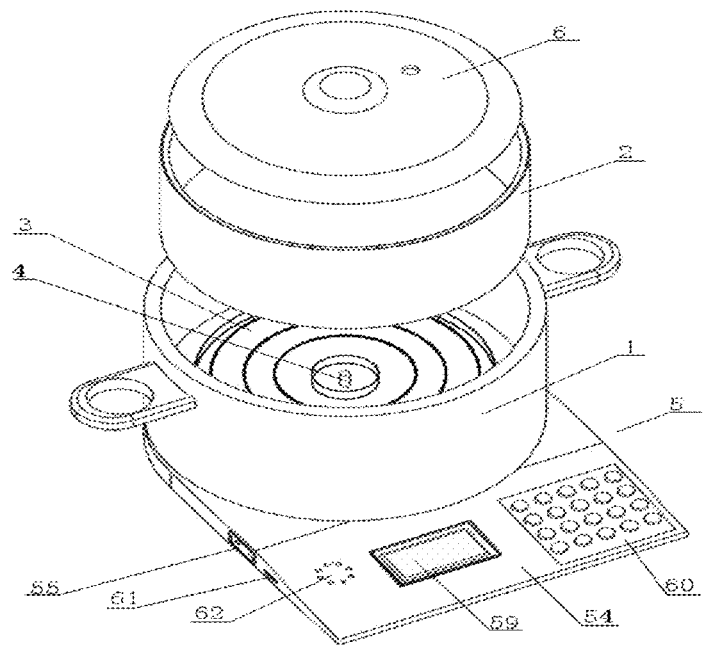
FIG. 7 is a structural drawing of the example 1 of the embodiments of this invention, in which the pot, the body and the electric heater use the mode of unification.
Figure 8:
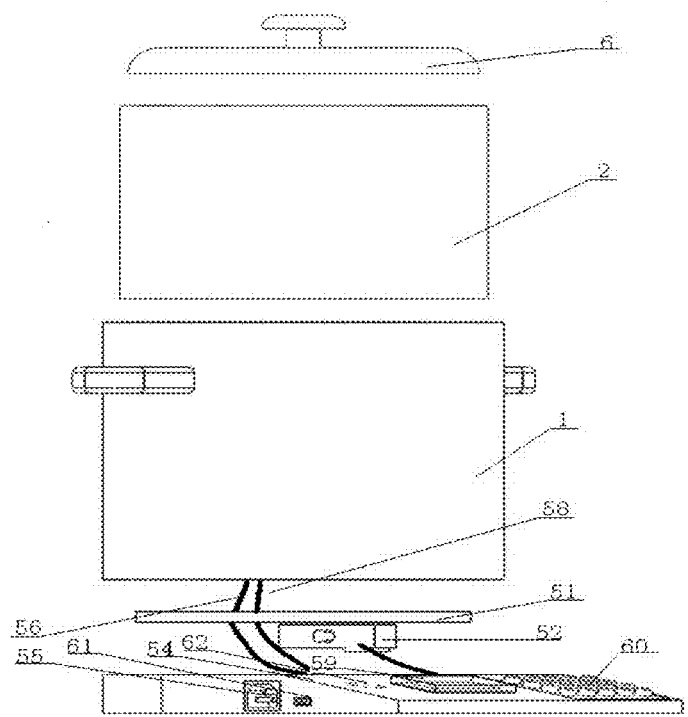
FIG. 8 is a front exploded view according to the example 1 of the embodiments of this invention.
Figure 9:
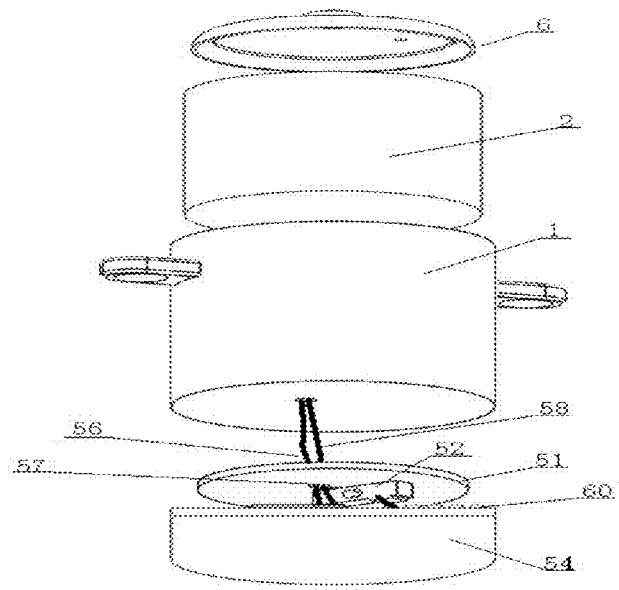
FIG. 9 is an upward exploded view according to the example 1 of the embodiments of this invention.
Figure 10:
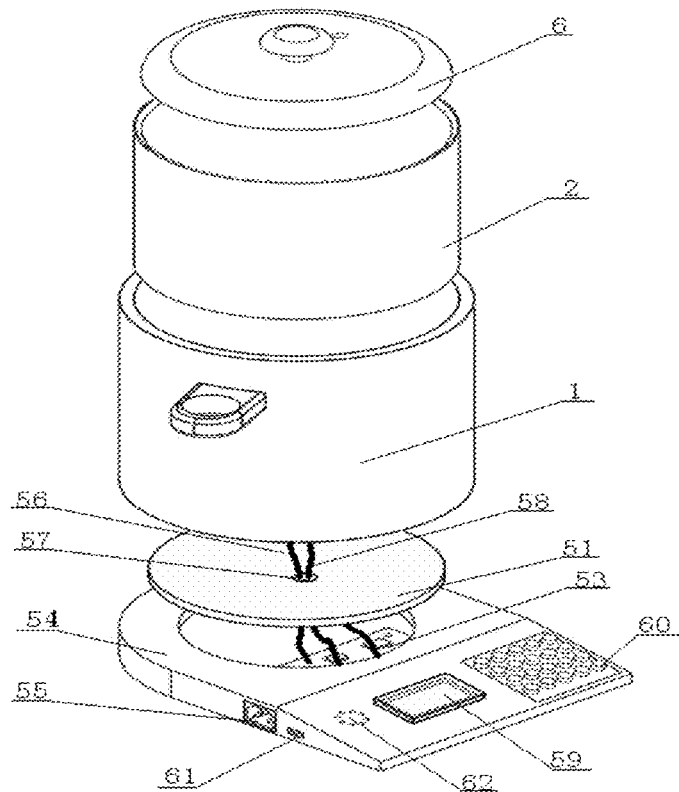
FIG. 10 is a downward exploded view according to the example 1 of the embodiments of this invention.
Figure 11:
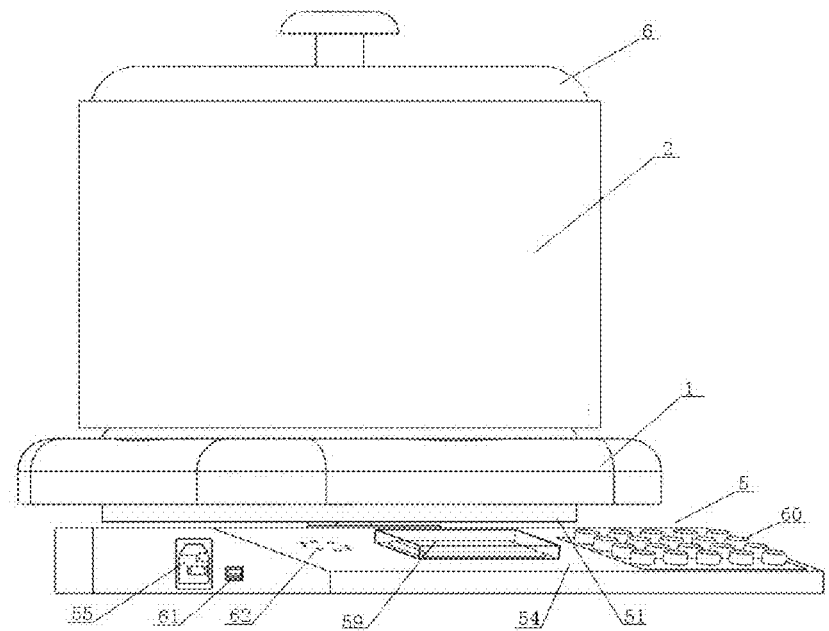
FIG. 11 is a front view of an example 2 of the embodiments of this invention.
Figure 12:
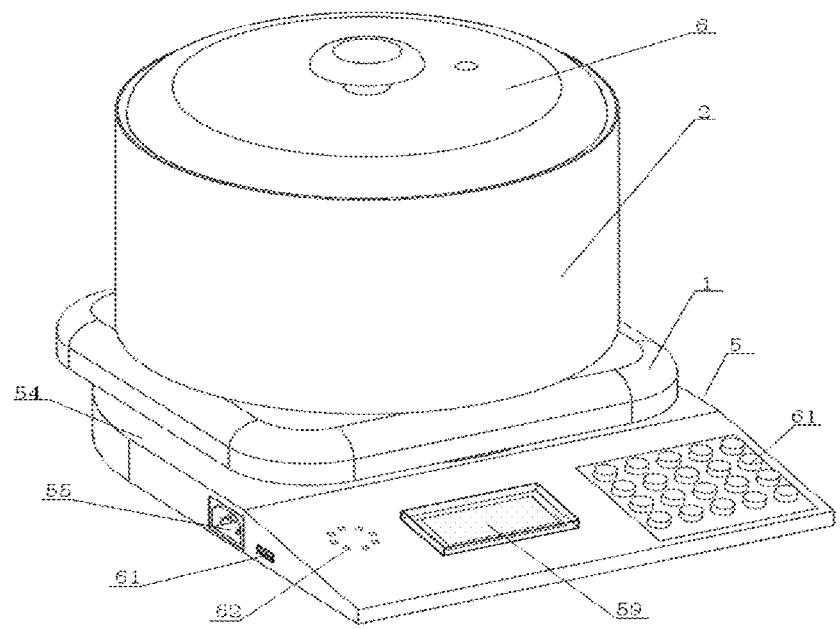
FIG. 12 is a downward view of the example 2 of the embodiments of this invention.
Figure 13:
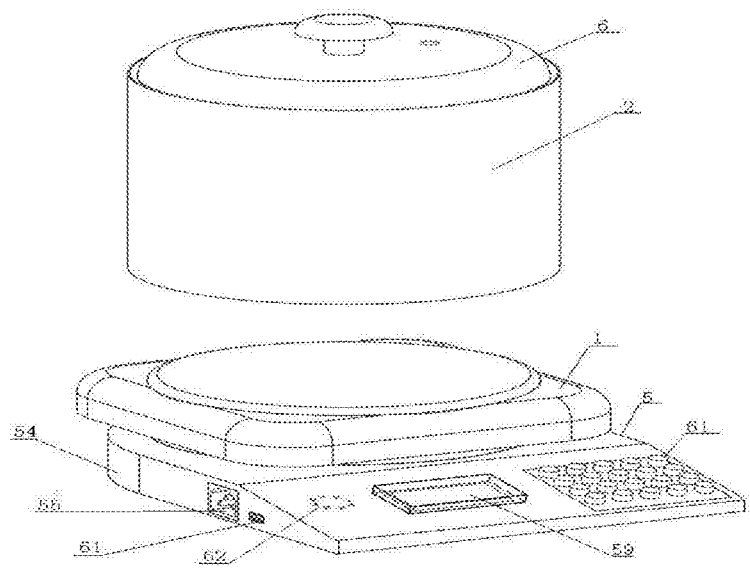
FIG. 13 is a structural drawing of the example 2 of the embodiments of this invention, in which the pot, the body, the electric heater use the mode of separation.
Figure 14:
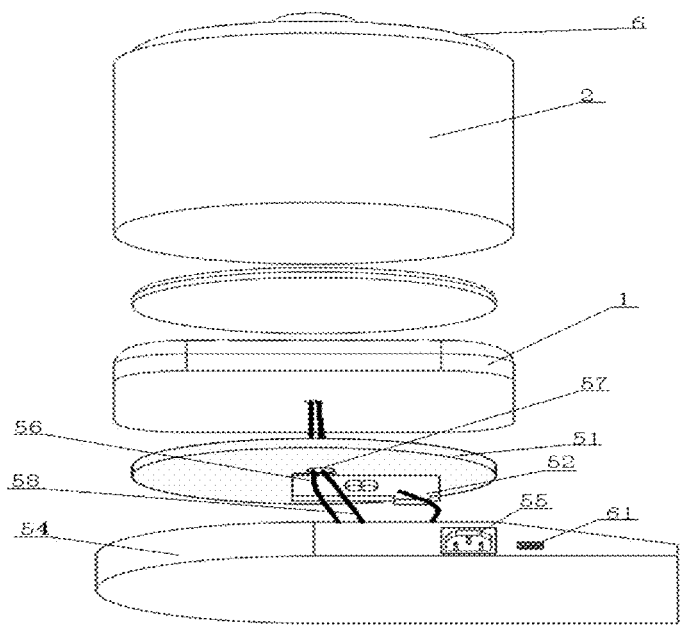
FIG. 14 is an upward exploded view according to the example 2 of the embodiments of this invention.
Figure 15:
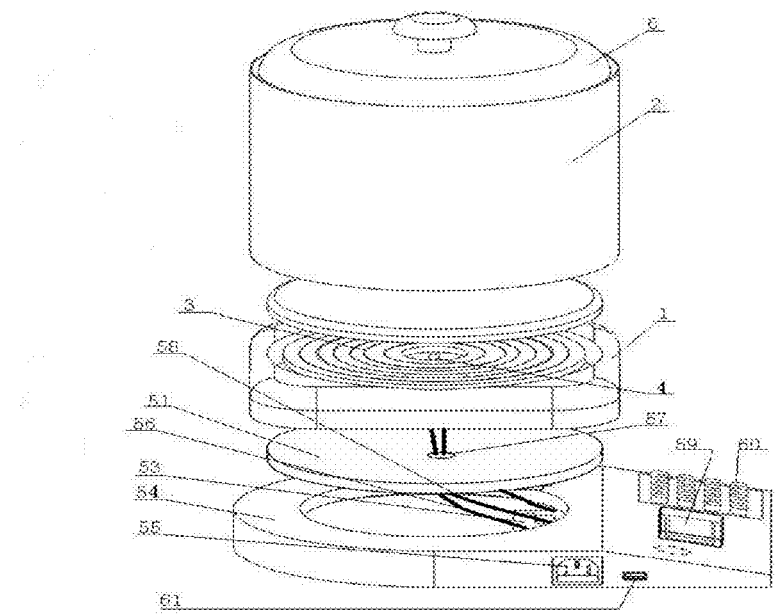
FIG. 15 is a downward exploded view according to the example 2 of the embodiments of this invention.

Similarly, as shown by FIG. 4, curve S2' is the weight change curve of the electrical heating cooker of this invention, which demonstrates the same points and the difference compared with the weight change curve S1 of the traditional electrical heating cooker during cooking porridge or cooking soup and stewing meat.

Curve S2' goes through the stages of: add-main-ingredient stage (A'), add-auxiliary-ingredient stage (A1'), add-water stage (B'), calm stage (C'), pre-boiling stage (D'), boiling-front stage (E1'), boiling-later stage (E2') and heat preservation stage (G'). The curve S2' combines the curve S2's boiling stage (E) with boiling-ending stage (F) and then divides it into boiling-front stage (E1') and boiling-later stage (E2'). Different from the traditional weight change curve S2, the weight of water to be added by the user at add-water stage (B') is an accurate value, and this value comes from summarized information provided by users at add-auxiliary-ingredient stage (A1'), which comprises the cooking mode chosen, cooker information chosen, the main ingredient's type chosen, the main ingredient's weight added in, and the flavor expected. And at add-auxiliary-ingredient stage (A1') there is a clear and accurate indication to the user of the auxiliary ingredients' type and weight to be added. What is the same as S2 is that the initial heating power $U_0$ is used at the calm stage (C'), pre-boiling stage (D'), and boiling-front stage (E1') of the curve S2'. But at boiling-later stage (E2') of the curve S2', several kinds of heating power are used at different weight points, so as to adequately extend the time length of boiling food. At last, heat preservation stage (G') is entered after the food is cooked.

And what the curve S2' is the same as the curve S1' is that during boiling-later stage (E2') the next action instruction of $\{U_{i-1}, \Delta m_i, \Delta t_i\}$ is repeatedly read from the cooking experience database stored in the memory and executed.

In order to realize the above the weighing control method of the electrical heating cooker, some examples of the embodiments of the invention of electrical heating cooker with weighing function are as the following.

Example 1 of the Embodiments of the Invention

Figure 16:
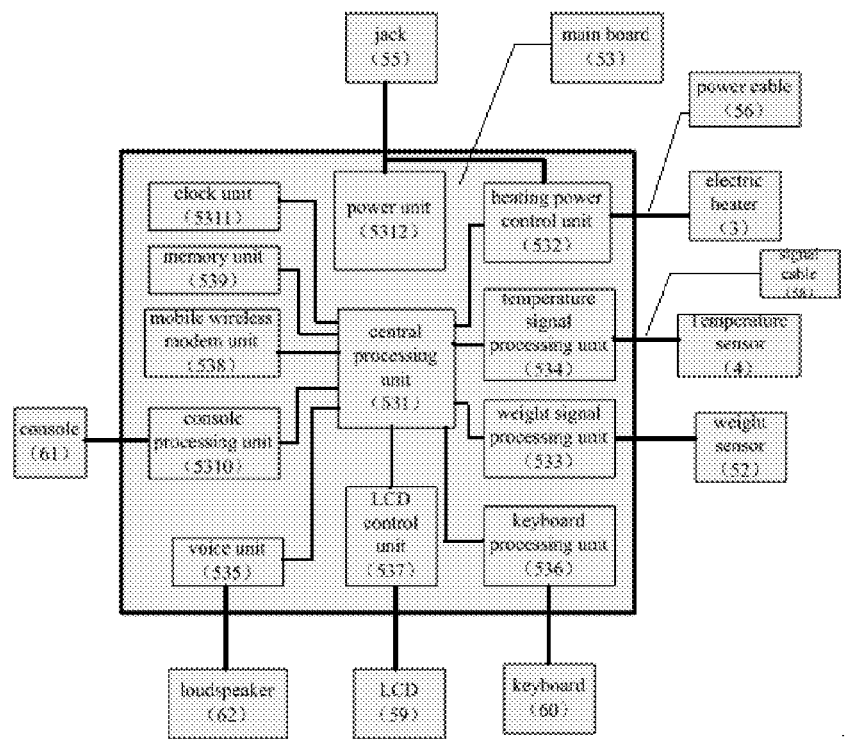
FIG. 16 is an electrical block diagram according to the embodiments of this invention.

An electrical heating cooker with weighing function uses the voltage heating mode, and its electric heater and pot uses the mode of unification. The structure of the electrical heating cooker with weighing function is shown as FIG. 5, FIG. 6, FIG. 7, FIG. 8, FIG. 9, and FIG. 10. The block diagram of its main board (53) of the electrical heating cooker and the connection to other modules is shown as FIG. 16. The electrical heating cooker comprises body (1), pot (2), an electric heater (3) for heating the pot (2), and a temperature sensor (4) for measuring the temperature of the bottom of the pot. But the pot (2) is not changeable and it can't be replaced by other kinds of pot, such as the traditional automatic rice cooker, electric pressure cooker, and electric ceramic cooker. The electric heater (3) will output a different heating power if input by a different voltage. An electronic scale (5) assembled under pot (2), and the electronic scale (5)'s precision reaches 5 g, 2 g or 1 g. The weight change of the cooker because of evaporating of the vapor during cooking is about several grams per ten or more seconds. The electronic scale (5)'s tray (51) is fixed at the bottom of the body (1), which will have a good stability. The electronic scale (5)'s tray (51) is fixed at the bottom of the body 1), which will have a good stability. The weight sensor (52) of the electronic scale (5) is also fixed at the bottom of the shell (54) of the electronic scale (5), which also has a good stability. The total weight of the electrical heating cooker and tray (51) is sensed by the weight sensor (52) of the electronic scale (5) and then processed by the main board (53) of the electronic scale (5) to amplify, filter, A/D and do other processing. The final result obtained is input to central processing unit (531). The electric supply whose voltage is 220V goes through the jack (55) of the shell (54) of the electronic scale (5) to provide electricity for all circuit, some is provided for power unit (5312) and the other is provided for heating power control unit (532). Power unit (5312) outputs different DC voltages to different chips to provide working voltage. The central processing unit (531) controls the power control unit (532) to output different AC voltages such as 240V, 220V, 200V, 180V, 160V, 140V, 120V, etc to the electric heater (3). Respectively the different output powers such as 900 W, 700 W, 600 W, 500 W, 400 W, 500 W, 300 W, etc are outputted by the electric heater (3). In addition, the power control unit (532) outputs voltages to the electric heater (3) through the power cable (56), which is connected to the electric heater (3) through the hole (57) in the center of the tray (51) under the bottom of the body (1). The temperature sensor (3) measures the bottom of the pot (2) to prevent the occurrences of abnormalities. The abnormalities include the rapidly increasing of the temperature of the bottom of the pot (2) because of the lack of water in the inner of the pot owing to the evaporating of water completely, and if this happens the heating is stopped or heat preservation power is used. The abnormalities also include the too low temperature of the bottom of the pot (2), and if this happens the warning message is also sent to the user. The clock unit (5311) of the main board (53) provides time information such as year, month, day, hour, minute and second. The user can set a specific time point to start heating. Mobile wireless modem unit (538) can receive the commands sent from the user's mobile remotely to start or stop heating. For example, the user can user his mobile to send the heating command to the mobile wireless modem unit (538) of the electronic scale (5). Or the mobile wireless modem unit (538) can also send the information of cooking completion or waning to the user remotely.

LCD (59), keyboard (60) and loudspeaker (62) are connected to the LCD control unit (537), keyboard processing unit (536) and voice unit (535) respectively. This forms the human interface unit. LCD (59) which informs the user what to do next step, or displays the current weight of the electrical heating cooker, or displays the current time, or etc. The loudspeaker (62) informs the user by voice. The user inputs information by the keyboard (60), so as to confirm or choose every kind of menus, or set the time.

Figure 19:
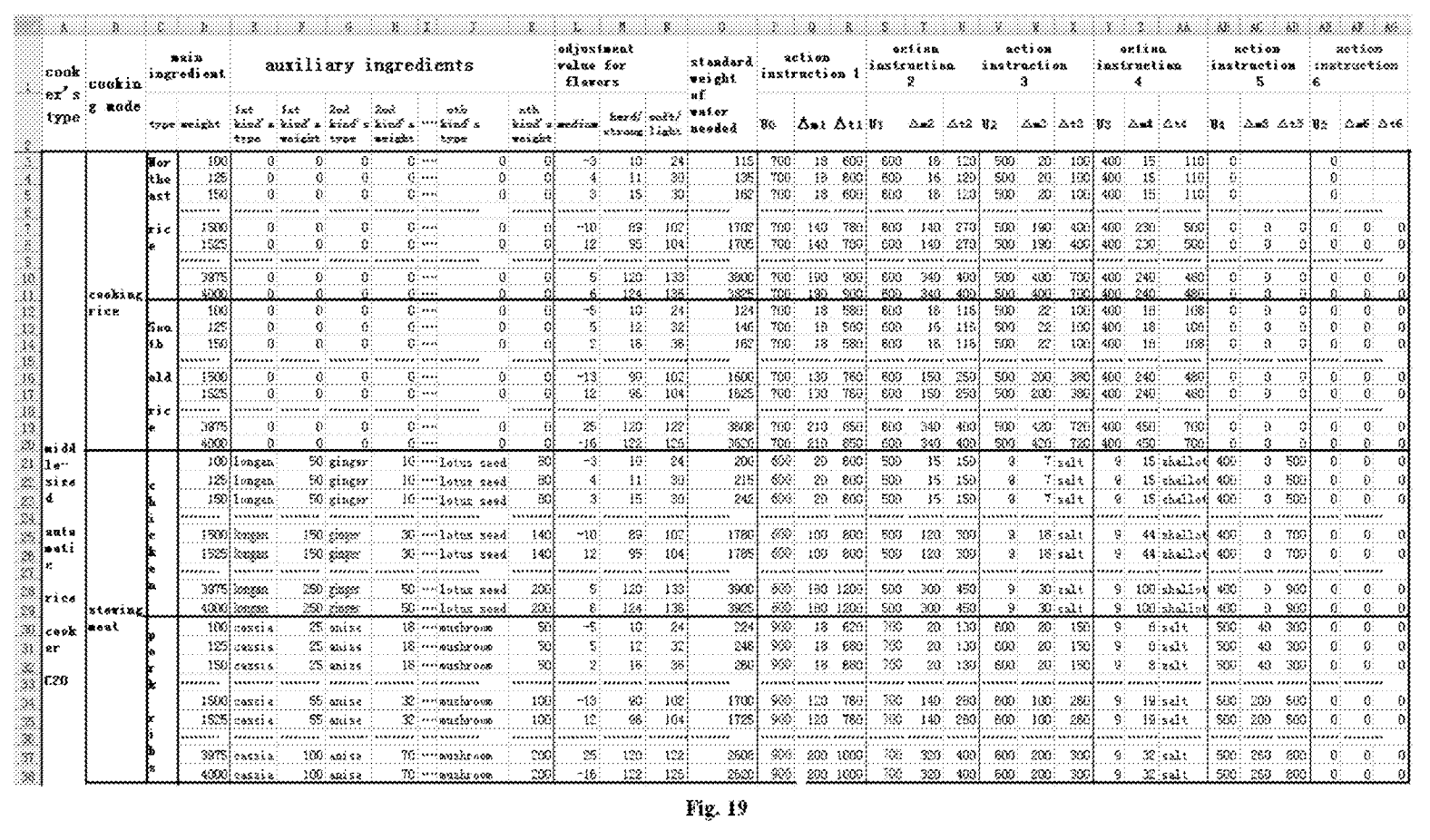
Figure 20:
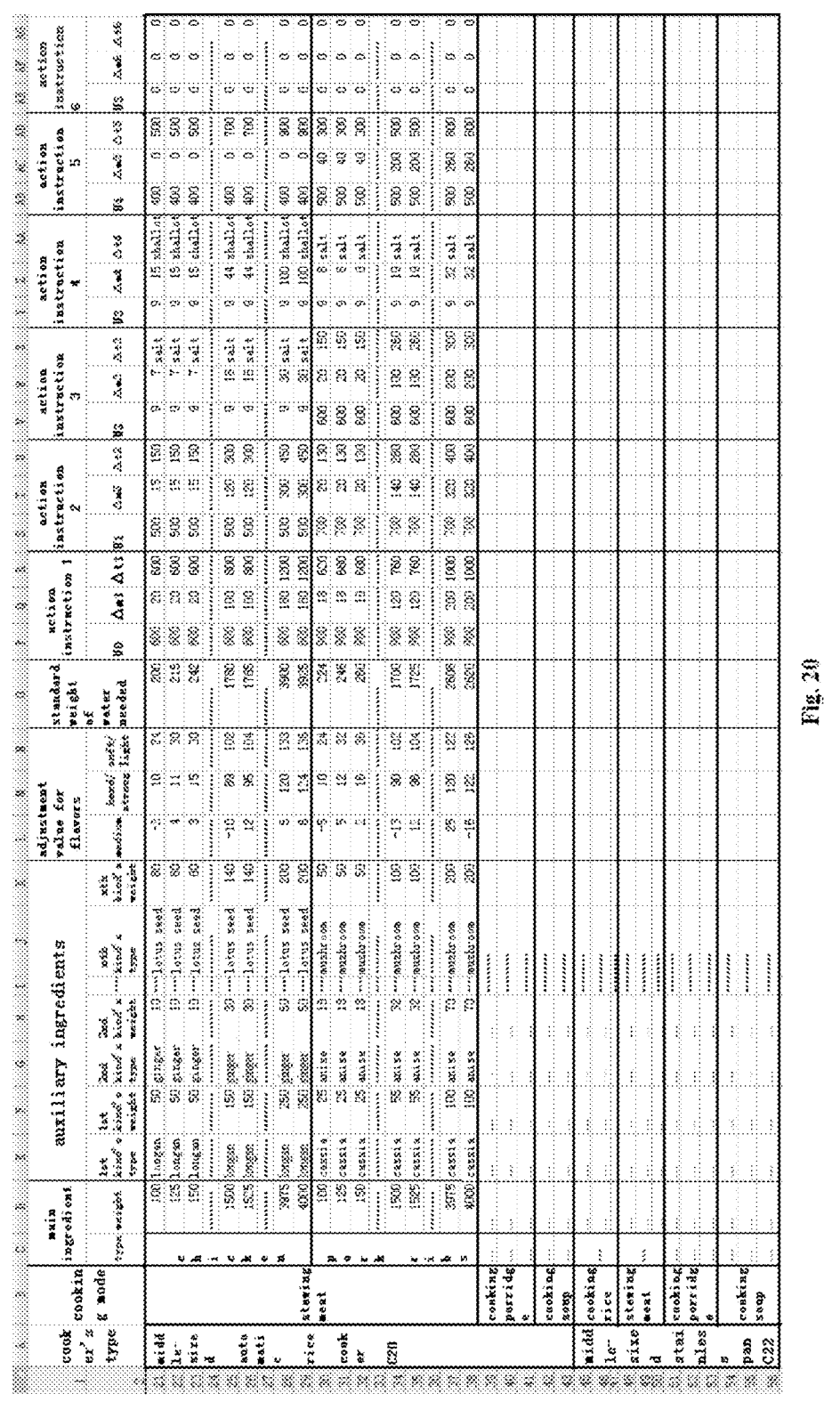

The memory unit (539) of main board (53) stores the cooking experience database, and the cooker information database shown as FIG. 19, FIG. 20, and FIG. 21. What is shown in the cooking experience database in these figures are only examples. Indeed, the actual data needs to be designed differently according to different types of pots. A record of the cooking experience database stands for the whole process of cooking, including asking the user to put the pot, to add main ingredient, to add auxiliary ingredients and to add water, changing the heating power at different weight points or at different time points until the end of the cooking. A record of the cooking experience database comprises the data items such as different cooking modes (available modes include cooking rice, cooking porridge or cooking soup and stewing meat), the information of the main ingredient needed for this specific cooking mode (including the main ingredient's type and weight), the information of the auxiliary ingredients needed (including each kind of auxiliary ingredient's type and weight), the standard weight of water needed, the adjustment value for flavors (including the water fine-tuning weight value to make the flavor medium, the fine-tuning weight value to make the flavor of rice or soup to be hard or strong, the fine-tuning weight value to make the flavor of rice or soup to be soft or light), and a serial of action instructions. The action instructions are a heating action instruction and an adding-auxiliary-ingredient action instruction. The heating action instruction comprises the parameter of heating power, the parameter of weight decreased and the parameter of time length. And the adding-auxiliary-ingredient action instruction comprises the parameter of adding auxiliary ingredient, the parameter of auxiliary ingredient's type and the parameter of auxiliary ingredient's weight.

The example of the cooking experience database shown as FIG. 19 and FIG. 20 is explained and described more fully here. This is a case that the type of pot chosen by the user is "middle-sized automatic rice cooker C20", the cooking mode chosen is "stewing meat", the main ingredient's type chosen by the user is "chicken", the flavor chosen by the user is "medium", and the weight of the main ingredient the user adds is 1506 g. From all records of stewing chicken in the cooking experience database, it can be seen that the weight points of chicken available to choose are from 100 g to the maximum weight point 4000 g and every point is at an interval of 25 g. The maximum weight that can be put into the pot has considered the volume of "middle-sized automatic rice cooker C20". Of course the weight can be divided at an interval of 10 g or less, but more records will be added and accordingly more memory will be needed. In this case, the weight is divided at an interval of 25 g. So many weight points of chicken are divided that the weight of chicken that the user has put in is equal to or very close to one of these weight points. For example in this case the user has put in 1506 g chicken, then the weight point of 1500 g which is the closest point to 1506 g is chosen, so the $25^{th}$ record at column 1 in the cooking experience database is indexed. In this record, auxiliary ingredients that needed to be added by the user are 150 g of longan, 30 g of ginger and 140 g of lotus seed, and the standard weight of water needed to be added is 1780 g, the water fine-tuning weight value to make the flavor medium is −10 g. So when the user chooses the flavor to be "medium", the accurate weight of water to be added is equal to the standard weight of water needed plus the adjustment value for the flavor "medium", which is 1780+(−10)=1770 g. The action instruction 1 $\{U_0, \Delta m_1, \Delta t_1\}=\{600,100,800\}$, which indicates starting heating with the initial heating power of 600 W until the weight decreases 100 g and the time length expected is about 800 seconds; The action instruction 2 $\{U_1, \Delta m_2, \Delta t_2\}=\{500,120,300\}$, which indicates the heating power is 500 W until the weight decreases 120 g and the time length expected is about 300 seconds; The action instruction 3 $\{U_2, \Delta m_3, \Delta t_3\}=\{9, 7, salt\}$, so this instruction is an adding-auxiliary-ingredient action instruction because $U_2$ is equal to 9, and the type of the ingredient to be added is salt and the weight is 7 g; the action instruction 4 $\{U_3, \Delta m_4, \Delta t_4\}=\{9, 15, shallot\}$, so this instruction is an adding-auxiliary-ingredient action instruction because $U_3$ is equal to 9, and the type of the ingredient to be added is shallot and the weight is 15 g; the action instruction 5 $\{U_4, \Delta m_5, \Delta t_5\}=\{400, 0, 700\}$, which indicates the heating power is 400 W and the heating time length is 700 second; the action instruction 6 $\{U_5, \Delta m_6, \Delta t_6\}=\{0, 0, 0\}$, which indicates the end of heating.

The cooking experience database shown as FIG. 19 and FIG. 20 is just an example to demonstrate. The parameters of every kind of electrical heating cooker are different such as volume, available heating powers, etc. Or different types of pots can be put on the electrical heating cooker, so a specific cooking experience database should be designed for a specific kind of pot. The user can renew the cooking experience database through the human interface of main board (53) or by connecting the console (61) of the electronic scale (5) to a computer, or the user can change, add or delete all the records or one record or one data item of a record, so as to define a cooking process of the user.

FIG. 21 is a schematic view of cooker information database and is one part of cooking experience database. The cooker information database is related with the cooker's type shown by FIG. 19 and FIG. 20. The cooker's type shown by FIG. 19 and FIG. 20 is used to search the cooker information database to get the cooker's weight, cooker lid's weight, cooker's volume, the slope's critical value of calm stage and the slope's critical value of pre-boiling stage. If the electric heater and pot of the electrical heating cooker uses the mode of unification, such as the traditional automatic rice cooker and electric pressure cooker, only one type of inner pot can be put on the electric heater, so only one type of pot is displayed on the LCD of the electronic scale and only one type of pot is available to be chosen by the user.

After the finish of the cooking, the electronic scale (5) informs the user to give flavor feedback for this cooking, and according to the flavor expected before heating the cooker will renew the adjustment value for flavors in one corresponding record of the cooking experience database stored in the memory (539) (including the water fine-tuning weight value to make the flavor medium, the fine-tuning weight value to make the flavor of rice or soup to be hard or strong, the fine-tuning weight value to make the flavor of rice or soup to be soft or light). If the user chooses the flavor expected to be medium, but after cooking the user gives the feedback that the flavor cooked is harder than the expected, then the cooker will increase the water fine-tuning weight value of the flavor medium in such a manner that the user will be informed to add more water to satisfy the user's flavor of medium if the totally same cooking mode is executed by the user next time. If the user chooses the flavor expected to be medium, but after cooking the user gives the feedback that the flavor cooked is softer than the expected, then the cooker will decrease the water fine-tuning weight value of the flavor medium, in such a manner that the user will be informed to add less water to satisfy the user's flavor of medium if the totally same cooking mode is executed by the user next time. If the user chooses the flavor expected to be medium, but after cooking the user gives the feedback that the flavor cooked is equal to the expected, then the cooker will not change the water fine-tuning weight value of the flavor medium. In the same way, if the user chooses the flavor expected to be rice hard or soup strong but after cooking the user gives the feedback that the flavor cooked is harder or softer than the expected or equal to the expected, then the cooker will respectively increase or decrease or not change the fine-tuning weight value to make the flavor of rice or soup to be hard or strong. If the user chooses the flavor expected to be rice soft or soup light but after cooking the user gives the feedback that the flavor cooked is harder or softer than the expected or equal to the expected, then the cooker will respectively increase or decrease or not change the fine-tuning weight value to make the flavor of rice or soup to be soft or light.

Example 2 of the Embodiments of the Invention

An electrical heating cooker with weighing function uses the electromagnetic heating mode, and its electric heater and pot uses the mode of separation. The structure of the electrical heating cooker with weighing function is shown as FIG. 11, FIG. 12, FIG. 13, FIG. 14, and FIG. 15. The circuit block diagram of its main board (53) and the connection to other modules are shown as FIG. 16. The cooker comprises a body (1), a pot (2), an electric heater (3) for heating the pot (2), and a temperature sensor (4) for measuring the temperature of the bottom of the pot. An electronic scale (5) is assembled under the pot (2), and the electronic scale (5)'s precision reaches 5 g, 2 g or 1 g. The weight change of the cooker because of evaporating of the vapor during cooking is about several grams per ten or more seconds. The electronic scale (5)'s tray (51) is fixed at the bottom of the body (1), so as to maintain a good stability. The weight sensor (52) of the electronic scale (5) is also fixed at the bottom of the shell (54) of the electronic scale (5), so as to maintain a good stability too. The total weight of the electrical heating cooker and tray (51) is sensed by the weight sensor (52) of the electronic scale (5) and then processed by the main board (53) of the electronic scale (5) to amplify, filter, A/D and do other processing. The final result obtained is input to central processing unit (531). But different from example 1 of the embodiments of the invention, the electric heater (3) uses the electromagnetic heating mode, such as electromagnetic furnace, and different pots (2) can be put on the electric heater (3). The pot (2) can be ordinary iron pan, medium-scale pressure cooker, small-scale pressure cooker or etc. The electric heater (3) converts the electric energy to electromagnetic energy to heat the pot (2). As is known the electromagnetic heating is an existing technology, and the power of the electric heater (3) depends on the electric current, and the electric current rests on the duty ratio of PWM signal. The bigger the duty ratio is, the bigger the electric current is. This existing technology will not be described further. In short, the heating power control unit outputs the PWM signal of different duty ratio to the electric heater (3) under the control of central processing unit (531), then the electric heater (3) will generate different power such as 1900 W, 1500 W, 1300 W, 1000 W, 800 W, 600 W, 500 W, 400 W, 300 W, or 200 W. The power cable (56), which is connected to the electric heater (3) through the hole (57) in the center of the tray (51) under the bottom of the body (1), outputs the PWM signal of different duty ratio and the 220V electric supply to the electric heater (3)

Cooker information database is shown by FIG. 21 and is one part of cooking experience database. The cooker information database is related with the cooker's type shown by FIG. 19 and FIG. 20. The cooker's type shown by FIG. 19 and FIG. 20 is used to search the cooker information database to get the cooker's weight, cooker lid's weight, cooker's volume, the slope's critical value of calm stage and the slope's critical value of pre-boiling stage. The electric heater and pot of the electrical heating cooker use the mode of separation, such as the electromagnetic furnace which can have different types of pot provided thereon. The electric heater (3) can have different scale pots and pressure cookers provided thereon. So the electronic scale (5)'s LCD (59) will display many types of pots of cooker information database available to be chosen by the user. The user uses the keyboard (60) to choose one of the cooker's types. So the electronic scale (5) will know the cooker's type according to choice of the user, and the cooker's type is one of the input parameters to further search the cooking experience database shown as FIG. 19, FIG. 20.

Other aspects of example 2 of the embodiments of the invention has the same structure and functions with the example 1, such as the different modules and units in the circuit block diagram of the main board (53), the format of the cooking experience database stored in memory unit (539), the renew of the cooking experience database according to the flavor feedback of the user after cooking, etc. These aspects are not described repeatedly further.

Figure 17:
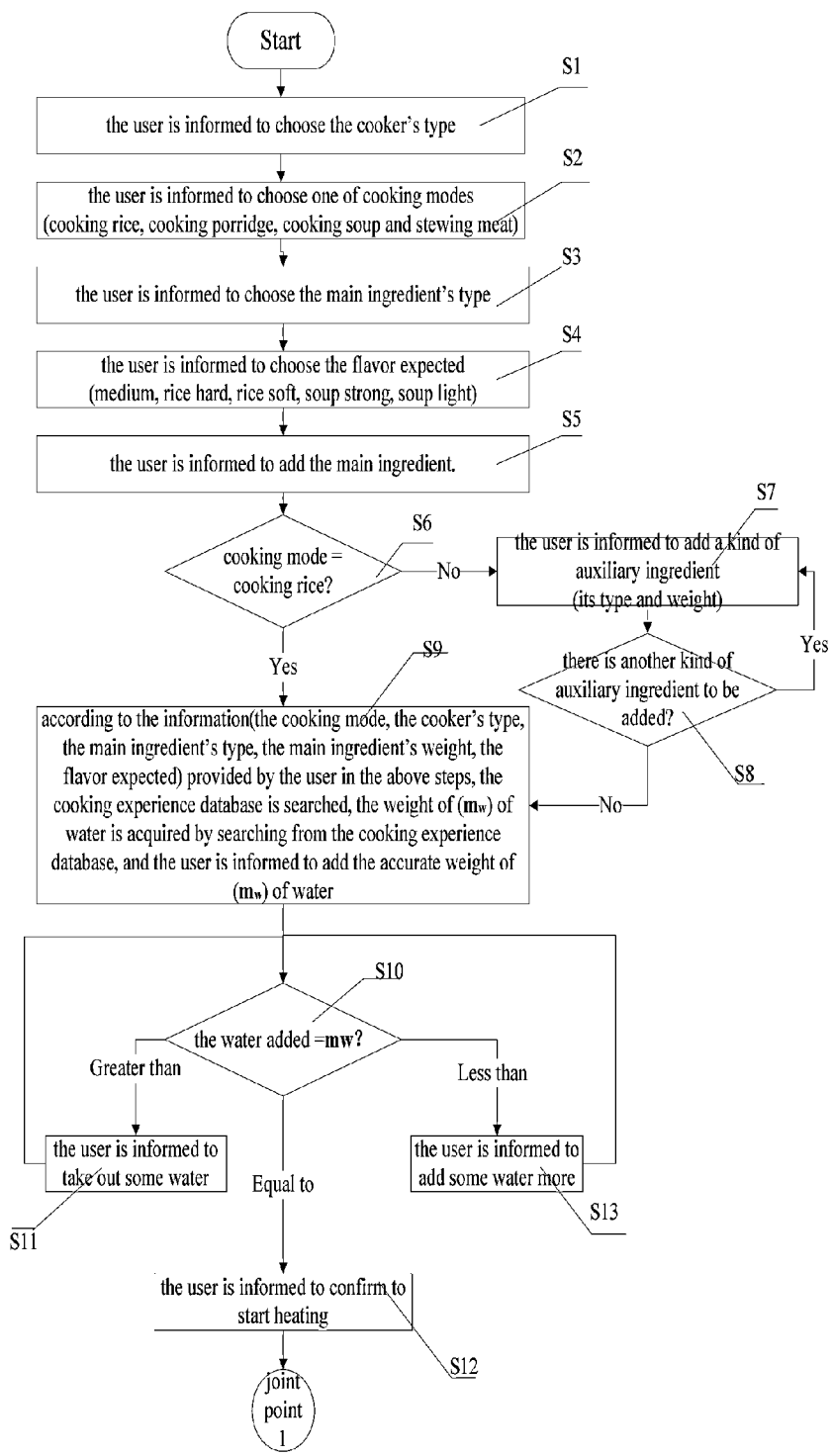
FIG. 17 is a flow chart of a central processing unit, illustrating the steps of adding main ingredient, adding auxiliary ingredients, adding water and etc before starting heating.
Figure 18:
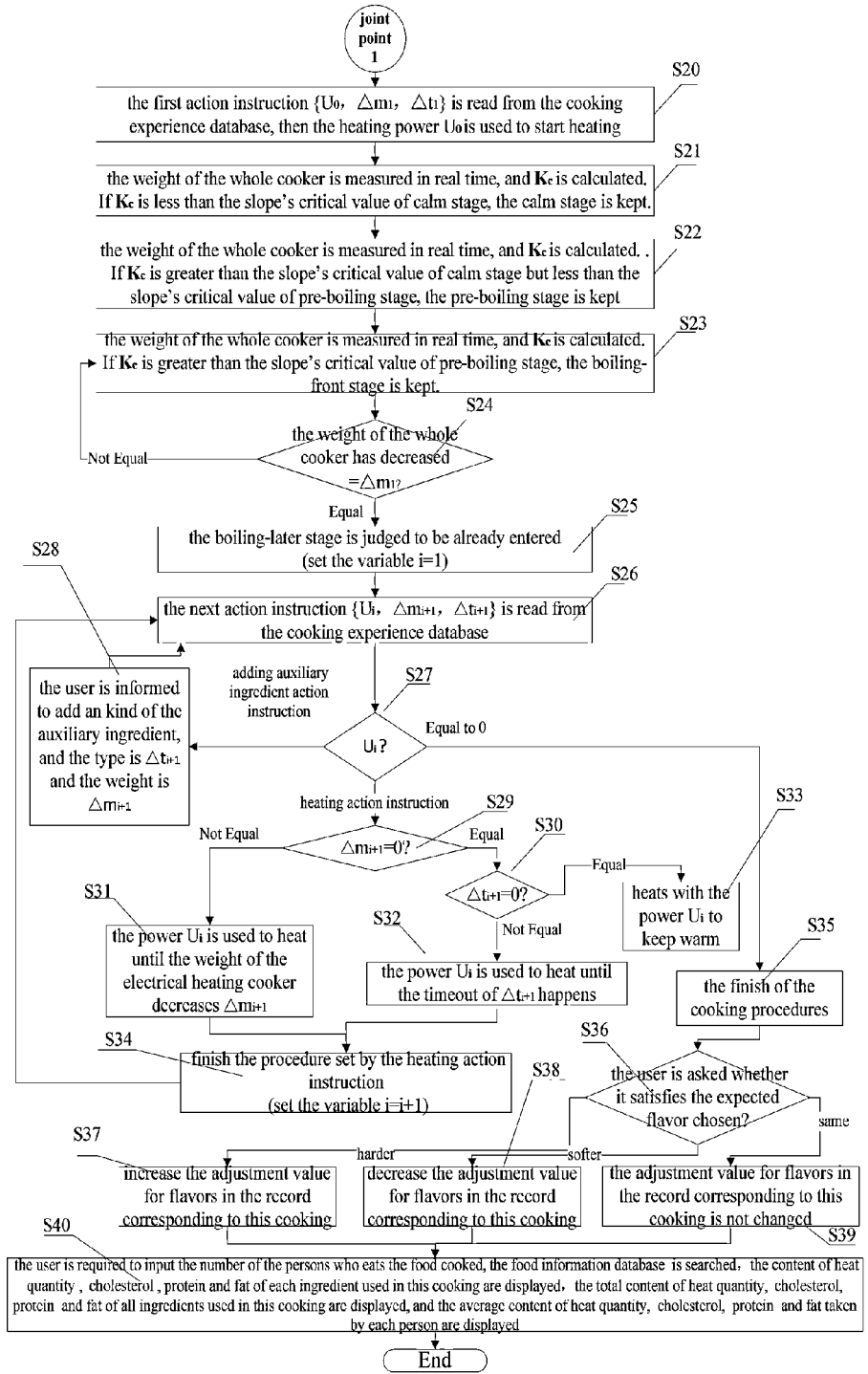
FIG. 18 is a flow chart of the central processing unit, which follows the FIG. 17, illustrating the weighing control process after starting heating.

The central processing unit (531) of main board (53) in example 1 and example 2 realizes the weighing control method as the flow chart shown as FIG. 17 and FIG. 18.

At step S1, the user is informed to choose the cooker's type. The cooker's types as shown as FIG. 21 are displayed and listed on the LCD (59). The user is also informed by the loudspeaker (62) to use the keyboard (60) to select. If the electric heater and pot uses the mode of unification, then only one cooker's type is available to be chosen; If the electric heater and pot uses the mode of separation, then several kinds of cooker's types are available to be chosen, and the user needs to choose one of them.

At step S2, the user is informed to choose one of cooking modes (available modes include cooking rice, cooking porridge, cooking soup and stewing meat). The available cooking modes are displayed on the LCD (59), and the user is also informed by the loudspeaker (62) to use the keyboard (60) to select one of them.

At step S3, the user is informed to choose the main ingredient's type. According to the cooker's type and the cooking mode selected, the central processing unit (531) searches the cooking experience database to display the available main ingredient's types suitable for cooking, and the user is also informed by the loudspeaker (62) to use the keyboard (60) to select one of the main ingredient's types.

At step S4, the user is informed to choose the flavor expected (available flavor options include medium, rice hard, rice soft, soup strong, soup light). The available flavor options are displayed on the LCD (59), and the user is also informed by the loudspeaker (62) to use the keyboard (60) to select. If the cooking mode selected at step S2 is cooking rice, then the available three flavor options displayed on the LCD are medium, rice hard and rice soft; If the cooking mode selected at step S2 is cooking porridge or cooking soup or stewing meat, then the available three flavor options displayed on the LCD are medium, soup strong, and soup light.

At step S5, the user is informed to add the main ingredient. The LCD (59) continuously displays the weight that has been added. And the user is informed to confirm the finish of adding the main ingredient.

At step S6, whether the cooking mode is cooking rice is judged. If it is, then step S9 is entered directly; if it is not, then step S7 is entered.

At step S7, the user is informed to add the auxiliary ingredients (including each kind of auxiliary ingredient's type and weight). As for cooking porridge or cooking soup or stewing meat, other kinds of auxiliary ingredients may be required to be added in besides the main ingredient. The central processing unit (531) searches the cooking experience database stored in memory unit (539), then gets the auxiliary ingredient's type and weight and displays by the LCD (59). And the user is informed to confirm the finish of adding this kind of the auxiliary ingredient by using the keyboard (60).

At step S8, whether there is another kind of auxiliary ingredient to be added is judged. If there is another kind of auxiliary ingredient, then step S7 is entered again and the user is informed to add a specific weight of this kind of auxiliary ingredient. If there is not another kind of auxiliary ingredient to be added, then step S9 is entered.

At step S9, according to the information (the cooking mode, the cooker's type, the main ingredient's type, the main ingredient's weight, and the flavor expected) provided by the user in the above steps, the cooking experience database is searched, the weight of ($m_w$) of water is acquired by searching from the cooking experience database, and the user is informed to add the accurate weight of ($m_w$) of water. And $m_w$ is equal to the sum of the standard weight of water needed and the adjustment value for the flavor chosen by the user (including the water fine-tuning weight value to make the flavor medium, the fine-tuning weight value to make the flavor of rice or soup to be hard or strong, the fine-tuning weight value to make the flavor of rice or soup to be soft or light). The LCD (59) continuously displays the weight of water that has been added and the weight of remaining water that still needs to be added next, and the user is informed to confirm the finish of adding water by keyboard (60).

At step S10, whether the water added is equal to $m_w$ is judged. If the water added is greater than $m_w$, then step S11 is entered; If the water added is less than $m_w$, then step S13 is entered; If the water added is equal to $m_w$, then step S12 is entered.

At step S11, the user is informed to take out some water. Because the user has added more water, the LCD (59) and loudspeaker (62) informs the user to take out some water, and the step S10 is entered again.

At step S12, the user is informed to confirm to start heating. The LCD (59) and loudspeaker (62) informs the user to confirm to start heating and to cover the lid. If the user confirms to start heating, then the step S20 is entered.

At step S13, the user is informed to add some more water. Because the user has added less water, the LCD (59) and loudspeaker (62) inform the user to add some water, and the step S10 is entered again.

At step S20, the first action instruction $\{U_0, \Delta m_1, \Delta t_1\}$ is read from the cooking experience database, then the heating power $U_0$ is used to start heating. The first action instruction is a heating action instruction, so the electric heater is controlled to use the initial heating power $U_0$ until the weight of the electrical heating cooker decreases $\Delta m_1$, and the expected time length is about $\Delta t_1$ seconds.

At step S21, the weight of the whole cooker is measured in real time, and $K_c$ is calculated. $K_c$ is the absolute value of the slope, which shows the speed of weight change of the whole cooker. If $K_c$ is less than the slope's critical value of calm stage, the calm stage is kept.

At step S22, the weight of the whole cooker is measured in real time, and $K_c$ is calculated. $K_c$ is the absolute value of the slope, which shows the speed of weight change of the whole cooker. If $K_c$ is greater than the slope's critical value of calm stage but less than the slope's critical value of pre-boiling stage, the pre-boiling stage is kept.

At step S23, the weight of the whole cooker is measured in real time, and $K_c$ is calculated. $K_c$ is the absolute value of the slope, which shows the speed of weight change of the whole cooker. If $K_c$ is greater than the slope's critical value of pre-boiling stage, the boiling-front stage is kept.

At step S24, whether the weight of the whole cooker has decreased $\Delta m_1$ is judged. If the weight has not decreased $\Delta m_1$, the step S23 is entered again and it's still at the boiling-front stage. If the weight has decreased $\Delta m_1$, then step S25 is entered.

At step S25, the boiling-later stage is judged to be entered already and set the variable i=1.

At step S26, the next action instruction $\{U_i, \Delta m_{i+1}, \Delta t_{i+1}\}$ is read from the cooking experience database.

At step S27, the value of $U_i$ is judged. $U_i$ is used to judge whether this instruction is a heating action instruction or an adding-auxiliary-ingredient action instruction. If $U_{i-1}$ is equal to 9, then this action instruction is an adding-auxiliary-ingredient action instruction, and step S28 is entered; if $U_{i-1}$ belongs to the set of the heating power values which can be output by electric heater, then this action instruction is a heating action instruction, and step S29 is entered; if $U_{i-1}$ is equal to 0, it indicates the end of the whole cooking, and then the step S35 is entered At step S28, the user is informed to add an kind of the auxiliary ingredient, and the type is $\Delta t_{i+1}$ and the weight is $\Delta m_{i+1}$. The LCD (59) and loudspeaker (62) inform the weight of this auxiliary ingredient that has been added. If the user has finished adding this auxiliary ingredient, then set the variable i=i+1 and the step S26 is entered again.

At step S29, the parameter $\Delta m_{i+1}$ of the action instruction got from step S26 is judged. If $\Delta m_{i+1}$ is not equal to 0, then step S31 is entered; if $\Delta m_{i+1}$ is equal to 0, then step S30 is entered.

At step S30, the parameter $\Delta t_{i+1}$ of the action instruction got from step S26 is judged. If $\Delta t_{i+1}$ is not equal to 0, then step S32 is entered; if $\Delta t_{i+1}$ is equal to 0, then step S33 is entered.

At step S31, the meaning of $\{U_i, \Delta m_{i+1}, \Delta t_{i+1}\}$ got from step S26 is that: the power $U_i$ is used to heat until the weight of the electrical heating cooker decreases $\Delta m_{i+1}$. $\Delta m_i$ is a determining factor of controlling and $\Delta t_{i+1}$ is only an auxiliary factor of monitoring. If after a time length of $\Delta t$ has elapsed, the weight of the electrical heating cooker hasn't decreased $\Delta m_{i+1}$ and $\Delta t - \Delta t_{i+1} > \epsilon_1$ ($\epsilon_1$ is a time threshold), it indicates that the time length $\Delta t$ for the weight to decreased $\Delta m_{i+1}$ has greatly exceeded the normal $\Delta t_{i+1}$ expected, hence it's assumed that abnormal situation has occurred, then loudspeaker (62) or mobile wireless modem unit (538) will inform the user the warning message.

At step S32, the meaning of $\{U_i, \Delta m_{i+1}, \Delta t_{i+1}\}$ got from step S26 is that the power $U_i$ is used to heat until the timeout of $\Delta t_{i+1}$ happens. $\Delta t_i$ is a determining factor of controlling.

At step S33, the meaning of $\{U_i, \Delta m_{i+1}, \Delta t_{i+1}\}$ got from step S26 is that the electric heater heats with the power $U_i$ to keep warm.

At step S34, this step finishes the procedure set by the heating action instruction of step S26 and set the variable i=i+1. Step S34 is after the step S31 or after the step S32. After step S34 is finished, the step S26 is entered again and the next action instruction is read from the cooking experience database.

At step S35, it indicates the finish of the cooking procedures.

At step S36, the user is required to give flavor feedback for this cooking, the user is asked whether it satisfies the expected flavor chosen at step S4. LCD (59) displays the options compared with flavor expected: 1) harder (or stronger); 2) softer (or lighter); 3) the same. The user is asked to select by keyboard (60). If the user selects 1) harder (or stronger), then step S37 is entered; if the user selects 2) softer (or lighter), then step S38 is entered; if the user selects 3) the same, then step S39 is entered.

At step S37, increase the adjustment value for flavors in the record corresponding to this cooking of the cooking experience database, so if the user implements the same cooking mode next time the user will be informed to add more water to satisfy the same flavor chosen. If the user chooses the flavor of medium at step S4, but at step S36 the user gives the flavor feedback of harder (or stronger) than the flavor expected, then increase the water fine-tuning weight value to make the flavor medium in the record corresponding to this cooking; If the user chooses the flavor of hard (or strong) at step S4, but at step S36 the user gives the flavor feedback of harder (or stronger) than the flavor expected, then increase the fine-tuning weight value to make the flavor of rice or soup to be hard or strong in the record corresponding to this cooking; If the user chooses the flavor of soft (or light) at step S4, but at step S36 the user gives the flavor feedback of harder (or stronger) than the flavor expected, then increase the fine-tuning weight value to make the flavor of rice or soup to be soft or light in the record corresponding to this cooking.

At step S38, decrease the adjustment value for flavors in the record corresponding to this cooking of the cooking experience database, so if the user implements the same cooking mode next time the user will be informed to add less water to satisfy the same flavor chosen. If the user chooses the flavor of medium at step S4, but at step S36 the user gives the flavor feedback of softer (or lighter) than the flavor expected, then decrease the water fine-tuning weight value to make the flavor medium in the record corresponding to this cooking; If the user chooses the flavor of hard (or strong) at step S4, but at step S36 the user gives the flavor feedback of softer (or lighter) than the flavor expected, then decrease the fine-tuning weight value to make the flavor of rice or soup to be hard or strong in the record corresponding to this cooking; If the user chooses the flavor of soft (or light) at step S4, but at step S36 the user gives the flavor feedback of softer (or lighter) than the flavor expected, then decrease the fine-tuning weight value to make the flavor of rice or soup to be soft or light in the record corresponding to this cooking.

At step S39, the adjustment value for flavors in the record corresponding to this cooking is not changed. Because at step S36 the flavor feedback given by the user conforms to expected flavor chosen at step S4, no change needs to be done for the adjustment value for flavors in the record corresponding to this cooking.

At step S40, the user is required to input the number of the persons who eats the food cooked by this cooking and the food information database stored in memory unit (539) is searched. The type and weight of each kind of ingredient used in this cooking is known. The ingredient type is used to search the food information database to get the content of heat quantity per 100 g of this ingredient, the content of cholesterol per 100 g of this ingredient, the content of protein per 100 g of this ingredient, the content of fat per 100 g of this ingredient, unmatched ingredients for this ingredient; then divide the total weight of one ingredient used in this cooking by 100, and hence multiply the result by the content of heat quantity per 100 g of this ingredient or the content of cholesterol per 100 g of this ingredient or the content of protein per 100 g of this ingredient or the content of fat per 100 g of this ingredient. As a result, the content of heat quantity of this ingredient, the content of cholesterol this ingredient, the content of protein of this ingredient and the content of fat of this ingredient used in this cooking is displayed by LCD (59). And the total content of heat quantity of all ingredients, the total content of cholesterol of all ingredients, the total content of protein of all ingredients and the total content of fat of all ingredients used in this cooking are displayed and if divided by the number of persons who eats the food cooked of this cooking, the average content of heat quantity, the average content of cholesterol, the average content of protein and the average content of fat taken by one person in this cooking are displayed. Then the user has a clear and direct knowledge of the nutrition contents and the healthiness of the food cooked.

The food information database shown by FIG. 22 is further explained here. The food information database is stored in memory unit (539). A record of said food information database comprises the ingredient type, the content of heat quantity per 100 g of this ingredient, the content of cholesterol per 100 g of this ingredient, the content of protein per 100 g of this ingredient, the content of fat per 100 g of this ingredient, unmatched ingredients for this ingredient, and matched ingredients for this ingredient. For example, as for the record of the ingredient type of beef, the content of cholesterol is 106 mg/100 g, the content of heat quantity is 229 Calorie/100 g, the content of protein is 25.8 g/100 g, and the content of fat is 14.3 g/100 g of beef. And the unmatched food of beef includes "white spirit", which indicates that beef and white spirit can't be eaten together. And the matched food of beef includes potato, which indicates that beef and potato cooked together is a good match. The user can renew the cooking experience database through the human interface of main board (53) or by connecting the console (61) of the electronic scale (5) to a computer, or the user can change, add or delete all the records or one record or one data item of a record.

The cooker information database shown by FIG. 21 is further explained here. It's just an example. It can be renewed according to the real conditions. What are emphasized here are the slope's critical value of calm stage and the slope's critical value of pre-boiling stage. They adopt the unit of g/15 seconds which means that how many grams are decreased per 15 seconds. Generally the slope is calculated as $k=\Delta m/\Delta t$. In this invention the unit of (g/1 second) is not used, because according to experiments the weight of the vapor evaporated in a second is less than 1 gram. And because of the constraint of the electronic scale's precision the vapor weight loss less than 1 g per second can't be detected. And it's not continuous that the pressure cooker emits vapor. This second it emits vapor, but next second it doesn't emit vapor. Therefore it's not necessary to measure the slope at a unit of 1 second. So an interval of $\Delta t=15$ seconds is used to measure. As a result a relatively real and stable slope is achieved. Of course other equivalent slope forms such as (g/10 seconds) or (g/20 seconds) can be used as well.

As for electric pressure cooker, the evaporating of vapor during cooking is not so obvious. But as there is still an initial stage of evaporating of vapor, the weighing control method can still be used. It's also a good guide to tell the user to add how much water and how much auxiliary ingredient for a specific weight of main ingredient and a good guide to display the nutrition contents and the health of the cooking. The weighing control method is assisted by time control and pressure control to achieve the whole cooking procedure of the electric pressure cooker.

In addition, the processing of abnormalities of the electrical heating cooker runs through the whole cooking. When use the electric pressure cooker or use the electromagnetic furnace to heat the pressure cooker, the cooker of this invention has the function of warning the user if the outlet of the cooker is blocked. If the outlet of the cooker is blocked, there is no vapor or very little vapor to emit from the cooker, and then the weight of the pressure cooker is nearly unchanged. If the weight of the pressure cooker keeps nearly unchanged, or the absolute value $K_c$ of the slope, which shows the speed of weight change of the whole cooker, tends to be very small or be 0, then it is assumed that the outlet of the cooker is blocked. Hence heating power control unit (532) stops heating under the control of central processing unit (531), then loudspeaker (62) or mobile wireless modem unit (538) will inform the user the warning message.

What is claimed is:

1. A weighing control method of an electric heating cooker comprising the following steps of:
   firstly, assembling a electronic scale with high-precision under the electric heating cooker, wherein precision of the electronic scale is 5 g, 2 g or 1 g, and a weight of the whole cooker is calculated by a main control unit of the electronic scale using a real-time pressure signal sent by a weight sensor of the electronic scale;
   secondly, storing the following information in a memory of the main control unit as a cooking experience database and a cooker information database, comprising:
   different cooking modes wherein available modes comprises cooking rice, cooking porridge, cooking soup and stewing meat,
   cooker information, comprising cooker's type, cooker's weight, cooker lid's weight, cooker's volume, the slope's critical value of calm stage and the slope's critical value of pre-boiling stage,
   information of a main ingredient needed for a specific cooking mode, which includes the main ingredient's type and weight,
   information of auxiliary ingredients needed, which includes each kind of auxiliary ingredient's type and weight,
   standard weight of water needed,
   adjustment values for flavors, which comprises a water fine-tuning weight value for a medium flavor, a fine-tuning weight value for a flavor of hard rice or strong soup, a fine-tuning weight value for flavor of soft rice or light soup,
   an initial heating power,
   an expected time taken to achieve boiling totally,
   after boiling to a specific weight point, another heating power is used until another specific weight point or until a specific timeout happens, and
   other auxiliary ingredients' type and weight needed to be added during boiling;
   thirdly, before the beginning of electrical heating, searching from the cooking experience database and the cooker information database stored in the memory of the main control unit according to factors chosen by the user, which comprise a cooking mode, cooker information, main ingredient's type, and main ingredient's weight added in, and flavor expected wherein available flavor options include medium, rice hard, rice soft, soup strong, soup light, so as to inform users types and weight of auxiliary ingredients to be added
   fourthly, after the beginning of electrical heating, measuring the weight change of the whole electric heating, cooker so as to obtain a slope which reflects the evaporating speed of the vapor, wherein this slope is compared with a slope's critical value of calm stage and a slope's critical value of pre-boiling stage to get the inner status of cooking of the cooker, the whole cooking heating process is divided into a calm stage, a pre-boiling stage, a boiling-front stage, a boiling-later stage and a heat preservation stage, and the initial heating power is used before the boiling-later stage begins, further during the boiling-later stage according to the cooking experience database at a specific weight point another heating power is used until another specific weight point or until a specific timeout happens, or ask the user to add another kind of auxiliary ingredients with a certain weight into the cooker, in the end heat preservation heating is used in the power heat preservation stage;
   fifthly, after achieving the cooking process, requiring the user to give flavor feedback for this cooking, accordingly the cooker will adjust the adjustment value for flavors of the cooking experience database stored in the memory of the main control unit to increase or decrease the water fine-tuning weight value.

2. The weighing control method of the electric heating cooker according to claim 1, wherein the weighing control method applies to electric heating cookers of voltage heating or electromagnetic heating, and doesn't involve the field of gas cooker.

\* \* \* \* \*